(12) United States Patent
    Alphin, III et al.

(10) Patent No.: US 10,467,230 B2
(45) Date of Patent: Nov. 5, 2019

(54) COLLECTION AND CONTROL OF USER ACTIVITY INFORMATION AND ACTIVITY USER INTERFACE

(71) Applicant: Microsoft Technology Licensing, LLC, Redmond, WA (US)

(72) Inventors: Thomas H. Alphin, III, Kirkland, WA (US); Kenneth Lynn Crocker, Sammamish, WA (US); Brian R. Meyers, Issaquah, WA (US); Michael J. Novak, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 292 days.

(21) Appl. No.: 15/442,399

(22) Filed: Feb. 24, 2017

(65) Prior Publication Data
    US 2018/0246937 A1    Aug. 30, 2018

(51) Int. Cl.
    *G06F 16/2457* (2019.01)
    *G06F 16/22* (2019.01)
    (Continued)

(52) U.S. Cl.
    CPC .......... *G06F 16/2457* (2019.01); *G06F 16/22* (2019.01); *G06F 16/248* (2019.01); *G06F 3/04847* (2013.01); *G06F 3/04855* (2013.01)

(58) Field of Classification Search
    CPC .... G06F 16/955; G06F 16/248; G06F 16/337; G06F 16/24578; G06F 16/338;
    (Continued)

(56) References Cited

U.S. PATENT DOCUMENTS

| 6,018,743 A | 1/2000 | Xu |
| 6,085,205 A | 7/2000 | Peairs et al. |

(Continued)

FOREIGN PATENT DOCUMENTS

| EP | 2608041 | 6/2013 |
| EP | 2851857 | 3/2015 |

(Continued)

OTHER PUBLICATIONS

"International Search Report and Written Opinion Issued in PCT Application No. PCT/US2018/023673", dated May 18, 2018, 12 Pages.

(Continued)

*Primary Examiner* — Angelica Ruiz
(74) *Attorney, Agent, or Firm* — Alleman Hall Creasman & Tuttle LLP

(57) ABSTRACT

Techniques are described for obtaining and displaying user activity information. For example, user activity information can include an application identifier, a content identifier, and a relevance identifier. A summary display is rendered for display that presents user activity information for user activities meeting relevance criteria. A user can select to view an activity details view, presenting information regarding all of their activity over a time period. A user can search for activities meeting particular criteria, and can view past activities along with applications currently being executed by the user.

20 Claims, 15 Drawing Sheets

(51) Int. Cl.
*G06F 16/248* (2019.01)
*G06Q 10/06* (2012.01)
*G06F 16/904* (2019.01)
*G06F 3/0484* (2013.01)
*G06F 3/0485* (2013.01)

(58) Field of Classification Search
CPC ...... G06F 21/6254; G06F 3/011; G06F 16/20; G06F 16/2453; G06F 16/38; G06F 16/9535; G06F 21/554; G06F 16/287
USPC .......... 707/600–831, 899, 999.001–999.206
See application file for complete search history.

(56) References Cited

U.S. PATENT DOCUMENTS

| | | |
|---|---|---|
| 6,957,395 B1 | 10/2005 | Jobs et al. |
| 6,993,723 B1 | 1/2006 | Danielsen et al. |
| 7,802,205 B2 | 9/2010 | Bedingfield |
| 7,970,240 B1 | 6/2011 | Chao et al. |
| 8,020,111 B2 | 9/2011 | Horvitz et al. |
| 8,037,046 B2 | 10/2011 | Udezue et al. |
| 8,353,012 B2 * | 1/2013 | Del Real ............ G06F 21/6218 705/326 |
| 8,364,514 B2 | 1/2013 | Macbeth et al. |
| 8,612,435 B2 | 12/2013 | Sambrani et al. |
| 8,789,014 B2 | 7/2014 | Robison et al. |
| 9,054,919 B2 | 6/2015 | Kiang et al. |
| 9,100,337 B1 | 8/2015 | Battre et al. |
| 9,125,015 B2 | 9/2015 | Pennanen et al. |
| 9,191,355 B2 | 11/2015 | Yerli |
| 9,230,027 B2 | 1/2016 | Greene |
| 9,317,390 B2 | 4/2016 | Chisa et al. |
| 9,342,209 B1 | 5/2016 | Hwang et al. |
| 9,363,634 B1 | 6/2016 | Kirmse et al. |
| 2002/0174134 A1 | 11/2002 | Goykhman |
| 2005/0235206 A1 | 10/2005 | Arend et al. |
| 2006/0004705 A1 | 1/2006 | Horvitz et al. |
| 2006/0155723 A1 | 7/2006 | Kumar et al. |
| 2006/0190440 A1 | 8/2006 | Horvitz et al. |
| 2006/0224583 A1 | 10/2006 | Fikes et al. |
| 2006/0288041 A1 * | 12/2006 | Plastina ............ G06Q 30/02 |
| 2007/0016553 A1 | 1/2007 | Dumais et al. |
| 2007/0143123 A1 | 6/2007 | Goldberg et al. |
| 2007/0211871 A1 | 9/2007 | Sjolander et al. |
| 2007/0297590 A1 | 12/2007 | Macbeth et al. |
| 2007/0299631 A1 | 12/2007 | Macbeth et al. |
| 2007/0299795 A1 | 12/2007 | Macbeth et al. |
| 2007/0299796 A1 | 12/2007 | Macbeth et al. |
| 2007/0300174 A1 | 12/2007 | Macbeth et al. |
| 2008/0046218 A1 | 2/2008 | Dontcheva et al. |
| 2008/0049714 A1 | 2/2008 | Commarford et al. |
| 2008/0133287 A1 | 6/2008 | Slattery |
| 2008/0276179 A1 | 11/2008 | Borenstein et al. |
| 2008/0300055 A1 | 12/2008 | Lutnick et al. |
| 2008/0313227 A1 | 12/2008 | Shafton et al. |
| 2009/0043646 A1 | 2/2009 | Pingali et al. |
| 2009/0228427 A1 | 9/2009 | Friesenhahn et al. |
| 2009/0241048 A1 | 9/2009 | Augustine et al. |
| 2009/0319472 A1 | 12/2009 | Jain et al. |
| 2010/0070527 A1 * | 3/2010 | Chen ............ G06F 16/70 707/772 |
| 2010/0235306 A1 | 9/2010 | Wagoner |
| 2010/0250322 A1 | 9/2010 | Norwood |
| 2011/0040990 A1 | 2/2011 | Chan et al. |
| 2011/0126050 A1 | 5/2011 | Begole et al. |
| 2011/0173525 A1 | 7/2011 | Mukhopadhyay et al. |
| 2011/0191303 A1 * | 8/2011 | Kaufman ............ G06F 7/00 707/684 |
| 2011/0289117 A1 | 11/2011 | Agrawal et al. |
| 2012/0084248 A1 | 4/2012 | Gavrilescu |
| 2012/0144416 A1 | 6/2012 | Wetzer et al. |
| 2012/0159564 A1 | 6/2012 | Spektor et al. |
| 2012/0246344 A1 | 9/2012 | Vargas et al. |
| 2012/0254100 A1 | 10/2012 | Grokop et al. |
| 2012/0271867 A1 | 10/2012 | Grossman et al. |
| 2012/0272230 A1 | 10/2012 | Lee |
| 2012/0303425 A1 * | 11/2012 | Katzin ............ G06Q 20/027 705/14.4 |
| 2012/0311447 A1 * | 12/2012 | Chisa ............ G06F 11/3082 715/719 |
| 2012/0331408 A1 | 12/2012 | Ainslie et al. |
| 2013/0013560 A1 | 1/2013 | Goldberg et al. |
| 2013/0013642 A1 | 1/2013 | Klein et al. |
| 2013/0013689 A1 | 1/2013 | Crawford |
| 2013/0067346 A1 | 3/2013 | Rosenstein et al. |
| 2013/0073389 A1 | 3/2013 | Heath |
| 2013/0080266 A1 | 3/2013 | Molyneux et al. |
| 2013/0080641 A1 * | 3/2013 | Lui ............ H04L 67/10 709/226 |
| 2013/0103699 A1 | 4/2013 | Perantatos et al. |
| 2013/0110623 A1 | 5/2013 | Kilroy et al. |
| 2013/0139113 A1 | 5/2013 | Choudhary et al. |
| 2013/0262439 A1 | 10/2013 | Hao et al. |
| 2013/0262539 A1 | 10/2013 | Wegener |
| 2013/0275509 A1 | 10/2013 | Micucci et al. |
| 2013/0275994 A1 | 10/2013 | Uola et al. |
| 2013/0347078 A1 | 12/2013 | Agarwal et al. |
| 2014/0012574 A1 | 1/2014 | Pasupalak et al. |
| 2014/0033291 A1 | 1/2014 | Liu |
| 2014/0068443 A1 | 3/2014 | Eng et al. |
| 2014/0098127 A1 | 4/2014 | Fein et al. |
| 2014/0108585 A1 | 4/2014 | Barton et al. |
| 2014/0122697 A1 | 5/2014 | Liu et al. |
| 2014/0162793 A1 | 6/2014 | Quan et al. |
| 2014/0207962 A1 | 7/2014 | Makofsky |
| 2014/0229391 A1 | 8/2014 | East et al. |
| 2014/0337339 A1 | 11/2014 | Li |
| 2015/0004998 A1 | 1/2015 | Pennanen et al. |
| 2015/0163530 A1 | 6/2015 | Bayer et al. |
| 2015/0235258 A1 | 8/2015 | Shah et al. |
| 2015/0235275 A1 | 8/2015 | Shah et al. |
| 2015/0256423 A1 | 9/2015 | Stearns |
| 2015/0294634 A1 | 10/2015 | Jung et al. |
| 2015/0339374 A1 | 11/2015 | Smarr et al. |
| 2015/0350106 A1 | 12/2015 | Whalley et al. |
| 2015/0365453 A1 | 12/2015 | Cheng |
| 2015/0370765 A1 | 12/2015 | Kim et al. |
| 2016/0162370 A1 | 6/2016 | Mehta et al. |
| 2016/0261709 A1 | 9/2016 | Sacks et al. |
| 2016/0294916 A1 | 10/2016 | Daher et al. |
| 2016/0296798 A1 | 10/2016 | Balakrishnan et al. |
| 2016/0302166 A1 | 10/2016 | Dang et al. |
| 2016/0352846 A9 | 12/2016 | Gauglitz et al. |
| 2017/0094635 A1 | 3/2017 | Liu et al. |
| 2017/0169403 A1 | 6/2017 | Zhang |
| 2017/0222865 A1 | 8/2017 | Koorapati et al. |
| 2017/0336960 A1 | 11/2017 | Chaudhri et al. |

FOREIGN PATENT DOCUMENTS

| | | |
|---|---|---|
| WO | WO 2005072191 | 8/2005 |
| WO | 2008021478 A2 | 2/2008 |
| WO | WO 2013192564 | 12/2013 |
| WO | WO 2014102698 | 7/2014 |

OTHER PUBLICATIONS

"International Search Report and Written Opinion Issued in PCT Application No. PCT/US2018/018575", dated Apr. 17, 2018, 11 Pages.

"What is ActivTrak? : What Customers Say", Retrieved From: https://web.archive.org/web/20170324061743/https://activtrak.com/faq, Mar. 24, 2017, 10 Pages.

Frank, et al., "A Hybrid Preference Learning and Context Refinement Architecture", In Proceedings of Workshop on Intelligent Pervasive Environments, Apr. 9, 2009, 7 Pages.

"Learn How People Use Your App—An App Analytics Tools Round-Up", Retrieved from http://web.archive.org/web/20170427042015/https://www.apptamin.com/blog/app-analytics-tools/, Retrieved on Apr. 27, 2017, 26 Pages.

(56) References Cited

OTHER PUBLICATIONS

"Tracking the Same Person across Different Devices with Google Analytic", Retrieved from http://www.seerinteractive.com/blog/real-cross-device-management/, May 8, 2014, 9 Pages.

Chen, et al., "Inferring Human Activity in Mobile Devices by Computing Multiple Contexts.", In Journal of Sensors, vol. 15, Issue 9, Aug. 28, 2015, 20 Pages.

Horvitz, et al., "Learning Predictive Models of Memory Landmarks", In Proceedings of the Annual Meeting of the Cognitive Science Society, vol. 26, Issue 26, Jan. 1, 2004, 6 Pages.

Kapusta, Stephen, "Google AdWords Cross-Device Reporting & Attribution", Retrieved from https://www.lunametrics.com/blog/2016/11/08/google-adwords-cross-device-reporting-attribution/, Nov. 8, 2016, 7 Pages.

Paul, Ian, "Top 15 Cloud Storage Tips and Tasks", Retrieved from https://www.pcworld.com/article/255072/top_15_cloud_storage_tips_and_tasks.html, May 6, 2012, 6 Pages.

"International Search Report and Written Opinion Issued in PCT Application No. PCT/US2018/023672", dated Jun. 6, 2018, 13 Pages.

"International Search Report and Written Opinion Issued in PCT Application No. PCT/US18/025775", dated Jul. 9, 2018, 12 Pages.

"International Search Report and Written Opinion Issued in PCT Application No. PCT/US18/025776", dated Jul. 3, 2018, 10 Pages.

"Non Final Office Action Issued in U.S. Appl. No. 15/590,858", dated Dec. 31, 2018, 15 Pages.

"Non Final Office Action Issued in U.S. Appl. No. 15/590,895", dated Nov. 1, 2018, 9 Pages.

"Observing the Activity of a Device", https://doc.nexthink.com/Documentation/Nexthink/V5.0/UserManual/Observingtheactivityofadevice, Retrieved on: Dec. 8, 2016, 5 pages.

"Non Final Office Action Issued in U.S. Appl. No. 15/662,057", dated Feb. 26, 2019, 49 Pages.

"Final Office Action Issued in U.S. Appl. No. 15/590,895", dated May 13, 2019, 8 Pages.

"Non Final Office Action Issued in U.S. Appl. No. 15/661,981", dated Sep. 6, 2019, 21 Pages.

Cao, et al., "Image Annotation Within the Context of Personal Photo Collections Using Hierarchical Event and Scene Models", In Proceedings of the IEEE Transactions on Multimedia, vol. 11, No. 2, Feb. 2009, pp. 208-219.

Gemmell, et al., "MylifeBits: A Personal Database for Everything", Microsoft Bay Area Research Center, MSRR-TR 2006-23, Feb. 20, 2006, pp. 1-18.

Mills, et al., "Managing Photos with AT&T Shoebox", In Proceedings of the 23rd Annual International ACM SIGIR Conference on Research and Development in Information Retrieval, Jul. 24, 2000, p. 390.

Toyama, et al., "Geographic Location Tags on Digital Images", In Proceedings of the Eleventh ACM International Conference on Multimedia, Nov. 2, 2003, pp. 156-166.

"Final Office Action Issued in U.S. Appl. No. 15/662,057", dated Jul. 18, 2019, 59 Pages.

"Final Office Action Issued in U.S. Appl. No. 15/590,858", dated Jun. 5, 2019, 18 Pages.

\* cited by examiner

COLLECTION AND CONTROL OF USER ACTIVITY INFORMATION AND ACTIVITY USER INTERFACE

BACKGROUND

Computer devices are becoming ever more ubiquitous, and more and more of people's day-to-day activities involve computer devices. During the course of a day, a user may carry out many activities using one or more computer devices—such as watching videos, listening to music, browsing the web, using a chat or communication program, working on a document or presentation, playing a game, among others.

In many cases, a user may be concurrently carrying out multiple activities using even a single computer device. Increasingly, people desire and need to carry out activities involving, and between, multiple computer devices. For example, a user may work on a related task, such as a work project, using multiple different computer devices, such as a smartphone, work desktop computer, laptop computer, and home desktop computer. A user may start watching an entertainment program on their laptop computer, but may wish to continue watching on their smartphone or tablet computer at a later time. A user may start researching a topic on the web at work on their desktop computer, and continue their research on a smartphone or tablet computer during their commute home.

As computer devices are used for a larger number of tasks, and become more integrated into people's lives, it can become challenging for a user to track their activities and associated content. For example, a user may wish to access a web page the user browsed two days earlier, but may not remember the address of the web page, or how they found it. A user may have been listening to a song on their computer device, or watching a video, but may no longer remember the title of the song or video.

In some cases, a computer device, such as an individual application running on the computer device or an operating system of the computer device, may provide some limited functionality for a user to try and trace their activity. For example, an operating system component may allow the user to view of a list of recently created or modified files. A web browser may allow a user to access a history of web pages visited by the user.

However, at least certain information regarding activities, such as files opened by a user but not modified by the user, may not be available to a user. Even when information is available, the specific information in which the user is interested may be intermixed with voluminous amounts of other information. For instance, the address of a web page a user wants to find may be intermixed with information for scores of other web pages the user visited on a particular day. If the user cannot remember the particular day they visited the web page, the task becomes even more challenging and frustrating. Thus, room for improvement remains for tracking a user's activities on one or more computer devices and making the information easily and intelligently accessible to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for acquiring and controlling information regarding user activities and presenting the user with various displays of all or a portion of the information. An activity summary display is provided, where a selected portion of the user's activity information is displayed. Displaying a subset of activity information that is more likely to be relevant to a user can assist the user in quickly locating a prior activity of interest, including so that they can resume the activity. Detailed activity views are also provided, and a user can select between a summary view and a detailed view of their activity. At least certain displays can display information for different activities in proximity to one another according to one or more criteria, such as according to a time period in which the user engaged in the activity or one or more relevance criteria. Displaying activities in proximity to one another according to one or more criteria can help a user more quickly locate information of interest, in part because the user may identify an activity they are looking for when the user views information for a related or associated activity (e.g., an activity they were engaged in at a similar time to the activity they are looking for).

According to an embodiment, a computer device is provided that includes a processing unit and memory. The computer device is coded to perform operations for implementing an activity store. The activity store stores activity information for a plurality of activities in a data structure. The activity information for each of the plurality of activities includes an application identifier and a content identifier. The computer device is further configured to implement an activity summary template. The activity summary template specifies relevance criteria for activities of the plurality of activities to include in an activity summary display. A rules engine is implemented by the computer device, and is coded to search the data structure and select activities of the plurality activities responsive to the relevance criteria. The computer device also implements a display engine. The display engine is coded to render the activity summary display based on the activity summary template using activity information of the activities selected by the rules engine.

In another embodiment, a method is provided for controlling data displayed to a user. Activity data is received for a plurality of user activities. The activity data is stored in a data store. Data is received for a plurality of applications currently being executed by a computer device. The user activity display is rendered for display. The user activity display includes at least a portion of the activity data for the plurality of user activities and at least a portion of the data regarding the plurality of applications currently being executed by the computer device.

In a further embodiment, a method is provided for selectively displaying summary or detailed views of user activity based on user input. Activity data is received for a plurality of user activities and stored in a data structure. The activity data comprises a relevance value. In a particular implementation, the relevance value can include a duration that the user was actively engaged in the activity over a time period. A request from a user is received to view relevant user activities. User activities are selected by searching the data structure and comparing the relevance values to relevance criteria. Data regarding the selected user activities is rendered for display. A request from a user is received to view data regarding the plurality of user activities. For each of the plurality of activities, data associated with each of one or more history records for the respective activity is rendered for display.

The present disclosure also includes computing systems and computer readable storage media configured to carry out, or including instructions for carrying out, an above-described method. As described herein, a variety of other features and advantages can be incorporated into the technologies as desired.

DETAILED DESCRIPTION

Overview

Figure 1:
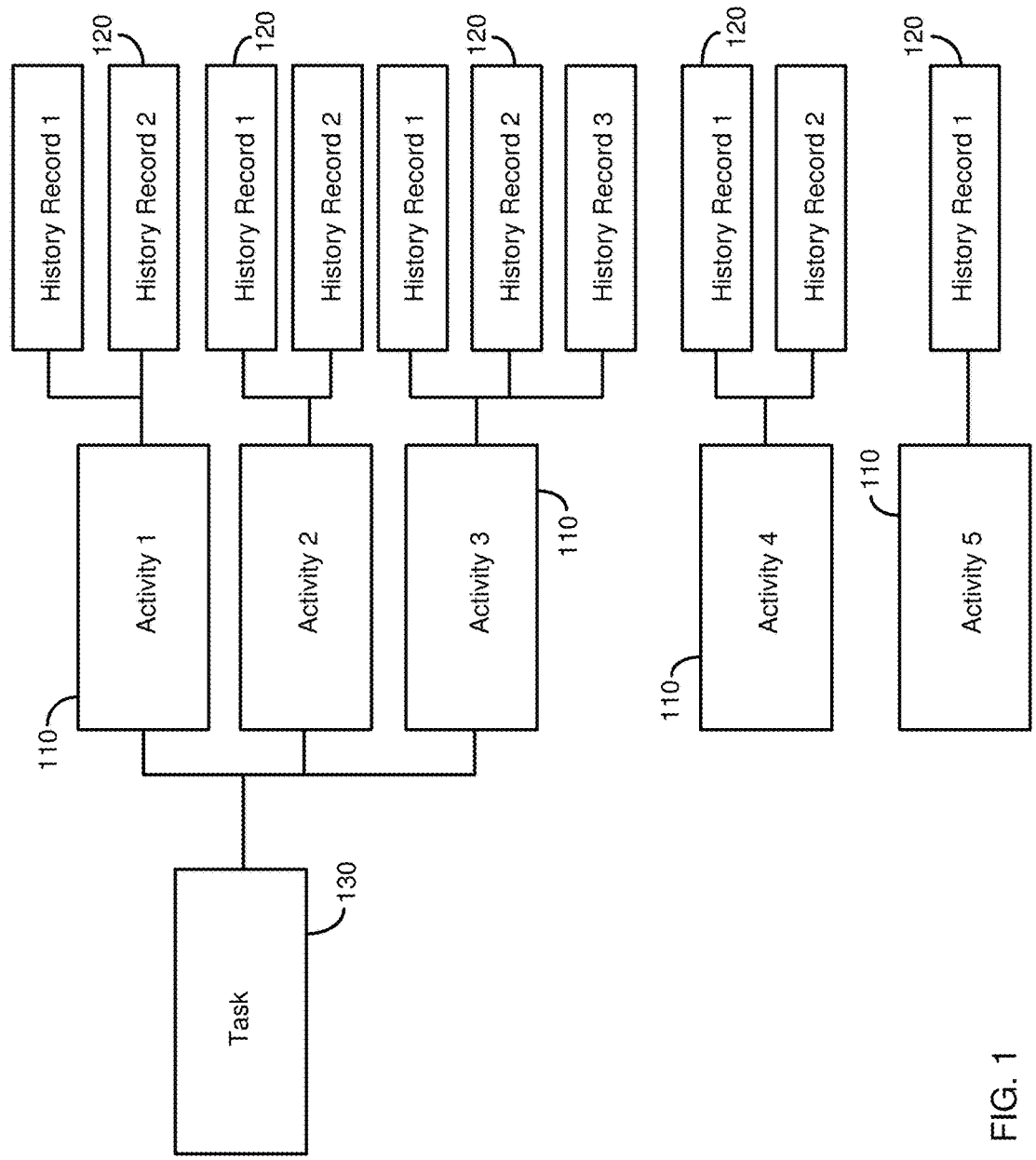
FIG. 1 is a diagram illustrating relationships between tasks, activities, and history records corresponding to user activity on one or more computer devices.

Computer devices are becoming ever more ubiquitous, and more and more of people's day-to-day activities involve computer devices. During the course of a day, a user may carry out many activities using one or more computer devices—such as watching videos, listening to music, browsing the web, using a chat or communication program, working on a document or presentation, playing a game, among others.

In many cases, a user may be concurrently carrying out multiple activities using even a single computer device. Increasingly, people desire and need to carry out activities involving, and between, multiple computer devices. For example, a user may work on a related task, such as a work project, using multiple different computer devices, such as a smartphone, work desktop computer, laptop computer, and home desktop computer. A user may start watching an entertainment program on their laptop computer, but may wish to continue watching on their smartphone or tablet computer at a later time. A user may start researching a topic on the web at work on their desktop computer, and continue their research on a smartphone or tablet computer during their commute home.

As computer devices are used for a larger number of tasks, and become more integrated into people's lives, it can become challenging for a user to track their activities and associated content. For example, a user may wish to access a web page they viewed two days earlier, but may not remember the address of the web page, or how they found it. A user may have been listening to a song on their computer device, or watching a video, but may no longer remember the title of the song or video. This situation can made even more difficult when a user's activities are distributed across multiple devices.

In some cases, a computer device, such as an individual application running on the computer device or an operating system of the computer device, may provide some limited functionality allowing a user to try and trace their activity. For example, an operating system component may allow the user to be able to view of a list of recently created or modified files. A web browser may allow a user to access a history of web pages visited by the user.

However, at least certain information regarding activities, such as filed opened but not modified by a user, may not be available to the user. Even when information is available, the specific information in which the user is interested may be intermixed with voluminous amounts of other information. For instance, the web page a user wants to find may be intermixed in with information for scores of other web pages the user visited on a particular day. If the user cannot remember the particular day they visited the web page, the task becomes even more challenging and frustrating.

Moreover, even if some search capabilities are provided on one device, the user may wish to review or continue their activities on a different device. For example, while a user's desktop computer may hold records of what documents a user opened, or what websites a user visited, that information is typically not available to a user wishing to review or resume that activity at another computer device, such as their smartphone or tablet computer. Thus, room for improvement remains for tracking a user's activities on one or more computer devices and making the information easily and intelligently accessible to the user, including allowing a user to resume their activities at a computer device that the activity was last carried out on, or a different computer device.

The present disclosure provides innovations that can allow a user to more easily track their activities on a computer device, and, in particular embodiments, across multiple computer devices. In part, the innovations can be facilitated by tracking the same, or related, user activities over time. The number of times the user engaged in an activity, or the duration of time the user spent engaged in the activity, can be related to its importance to the user. For example, if a user spent twenty minutes on a particular web page, that might indicate that the web page was more important than another web page that the user landed on and then immediately navigated back to a prior page. However, a web page that the user visited for only a short time, but resulted in another, related, significant activity, such as sending an email or placing a phone call, may indicate that the web page has a high significance to the user.

Thus, as will be described in more detail, the disclosed innovations relate to collecting data regarding user activities, organizing the information, such as associating user actions with a single activity, rather than as a series of isolated actions, and providing user interfaces that enable the user to review their activities to find information of interest. In at last some cases, information provided to a user can include features that enable the user to resume the activity. For example, if the activity was watching a movie, the user can be presented with information regarding that activity, and if the user selects the activity, the user may be taken to an application capable of displaying the movie (such as the application on which the movie was originally viewed), the movie can be loaded into the application, can be forwarded to the position where the user left off watching the movie, and playback can be resumed.

The disclosed innovations also provide user interfaces to assist a user in quickly locating items of interest. For example, a user interface can provide a summary view or display of activities, where only activities meeting threshold criteria are displayed. While it may be likely that this summary display will include the information of interest to a user, in some cases, such information may not be included. The user can be given an option to select a display that includes all of the user's activities (e.g., all of their activity over a time period), or activities meeting another criteria (such as activities meeting criteria to qualify as "activities," rather than "noise"). Displays can include features that allow a user to browse or scroll through activities, where the display gives an indication of how relevant displayed activities may be. For instance, as a user scrolls through the display, activities that are determined to be more relevant, such as having been engaged in by the user for a longer period of time, may be displayed for a longer duration than activities that are determined to be less relevant, such as having been engaged in by the user for a shorter period of time. Or, a relevant activity can be displayed for an entire period during which the user engaged in the activity, and a relevance threshold for displayed activities can be adjusted to maintained a desired number of simultaneously displayed activities.

Information regarding user activity can be collected across multiple devices and distributed to devices other than the device on which the activity was performed, including through an intermediate service or one of the computer devices that serves as master repository for user data. In particular cases, an intermediate service, such as a cloud-based service, collects activity information from multiple computer devices of a user, and reconciles any differences between activity information from the devices. The intermediate service (or master device) can thus serve as an arbiter of activity "truth," and can distribute activity information to the user's devices, including such that a particular device may be provided with activity information for other user devices, or updated information can be provided for the particular devices. In this way, displays can be provided that allow a user to view their activity across multiple computer devices.

In some cases, a user can be provided with options to resume an activity on a device other than a device where the activity was originally carried out, or to execute from a device where a user views activity information a request to resume an activity another device. For instance, a user may view an activity originally conducted on their smartphone, and may choose to resume the activity on their desktop computer from which they are viewing an activity display. Or, a user may view the activities on their smartphone, and choose to resume an activity conducted on their tablet computer at the tablet computer by selecting an option on the activity display of the smartphone.

Thus, the disclosed innovations can provide a number of advantages, including:

- collecting user activity information that can allow a user to quickly locate the activity or related activities;
- collecting user activity information that can allow a user to easily resume an activity, which can save computing processing and memory compared to a user manually resuming an activity, or having to resume multiple activities until a desired activity was identified;
- collecting and storing user activity information that provides state information for the activity;
- presenting user activity information to a user in a format that highlights activities likely to have greater relevance to the user, reducing the time needed for a user to locate an activity and providing a more streamlined interface to the user;
- presenting a complete history of user activity, or activity meeting minimum criteria to the user;
- allowing a user to automatically resume a prior activity, which can save computing processing and memory compared to a user manually resuming an activity, or having to resume multiple activities until a desired activity was identified;
- providing an interface for applications to provide activity information;
- providing a user activity monitoring component to determine user activity information;
- synchronizing user activity information over multiple user computer devices;
- providing displays of user activity information that include user activity information from multiple computer devices;
- providing a service that collects, distributes, and optionally arbitrates activity information collected from multiple computer devices;
- allowing a user to resume an activity on a computer device other than the computer device on which the activity was originally conducted; and
- allowing a user to resume an activity on a device other than a device where the user is viewing activity information.

These innovations relate to the technical field of computer science, as they collect, distribute, and arbitrate information regarding a user's activity on one or more computer devices and facilitate further user activity. By allowing a user to quickly resume a prior activity, the innovations improve the operation of the computer device, as the prior activity can be resumed more quickly than if the user manually carried out every step required to resume an activity, such as at a point when they last engaged in the activity. The innovations also improve the functioning of computer devices through innovative user interfaces that allow the user to interact with the computer devices to quickly locate relevant information and resume an activity. The innovations also facilitate interactions between computer devices, such as by allowing users to view activity information from one device on another device, resume an activity at a device that was originally carried out on another device, or resume an activity on a device by providing input on another device.

User History Records, Activities, and Tasks

In some aspects of the present disclosure, user activity associated with one or more computer devices is monitored. FIG. 1 illustrates how user activities 110 can have one or more history records 120 indicating a discrete instance of the activity, or an event associated with the activity, and how tasks 130 can include multiple activities. Activities 110 are typically associated with a software application and one or more particular content items (e.g., a document, a movie, a music file) that a user accesses or interacts with using the software application. Examples of software applications and associated content can be a word processing program and a particular file that was created, modified or accessed, a music program and a song or album the user listened to, a video playback program and a particular video the user watched, a social media application and particular individuals or entities the user viewed or contacted, and a web browser and particular web pages visited by the user.

In some cases, a user may engage in an activity 110 on a single occasion. In other cases, a user may engage in the same activity 110 on multiple occasions. For instance, in writing a document, a user may create the document and then edit it on multiple different occasions. At some point, the user may be finished with the document, and may not access it again, or may not access it again for a long period of time.

Each discrete occasion during which a user engages in an activity 110, or particular events associated with an activity (e.g., printing a document, forwarding an email, bookmarking a web page) can be represented, and summarized, by a history record 120. A history record 120 can be associated with a time the user began a particular instance of the activity 110 (or a time an event occurred), a time the instance ended, a duration the user was actively engaged in the activity, and other information.

History records 120 can include information that can be used to provide an indication of the importance of an activity (or instance or event thereof) relative to other activities (or instances or events thereof) a user may have engaged in over a time period. Relevance information can be a measure of how important the activity is likely to be to the user compared with other contemporaneous activities in which the user engaged using the same computer device, or among activities carried out by the user using multiple computer devices. For example, a user may listen to music using their smartphone at the same time they are editing a document on their laptop computer. Over the same time period, the user may send text messages using their smartphone, and have a web browser open on their laptop.

Activities 110 carried out using a single computer device may have differing relevance, or importance to the user. For instance, in the example above, although the user had a web browser open on their laptop, the most important activity to them may have been the document they were editing. On the smartphone, the text messages sent by the user may have a greater relevance to the user than the music they were listening to. Among all the activities being carried out by the user over a time period, editing the document may have been the most relevant activity. As will be further described, relevance can be determined in a number of ways based on various parameters. In addition, relevance can be calculated or measured using different schemas. For instance, a user may indicate that they want to view the most relevant work activities or the most relevant non-work activities.

Relevance can be determined by a single factor or a combination of multiple factors. One factor can include the amount of time a user was actively engaged in an activity 110. Another factor can relate to significant actions a user performed while engaging in the activity 110. In some cases, significant actions can be defined and reported by a particular application—for example, an application may report forwarding an email or "liking" a social media post as a significant action. In other cases, significant actions can be determined in other manner, such as by a user's action tracked by an operating system. For instance, the act of printing an object, such as a file or web page, can be designated as a significant action and used to help determine a relevance value for the activity 110 (or a particular history record 120 or instance of the activity), or otherwise associated with the activity (such as being noted in an appropriate history record for the activity).

Different applications, and their corresponding activities 110, can be associated with higher or lower relevance factors, including depending on a type of application (e.g., a word processor may be assigned a higher relevance than a music playback application, web browser "A" may be assigned higher relevance than web browser "B", an "entertainment" application may be assigned a lower relevance than a "productivity" application). The relevance of an activity associated with an application may also depend on what other activities a user was simultaneously performing. For instance, word processing might be ranked as more relevant than web browsing, when performed concurrently, but web browsing might be ranked as more relevant than concurrent music playback.

Relevance can be determined, or refined, using machine learning techniques. For instance, if activities 110 are marked as relevant, but a user instead views information regarding other activities, the definition of relevance, or assigned relevance values, can be modified. Similarly, heuristics can be used to create or adjust relevance values. For example, patterns of user activities (e.g., a user likes to listen to music while reading the news on a website) or context (e.g., time of day, day of the week) can be recognized, and relevance indicators created or adjusted. When multiple factors are used to determine relevance values, or assign an overall relevance score to an activity 110 (or history record 120 or task 130), the factors can be weighted, or assigned confidence values, and the weightings or confidence values periodically adjusted, such as using machine learning, heuristics, or other techniques.

History records 120 can be generated by software applications with which the user interacts. In some cases, a software application, such as through an interface (e.g. calling a method to create or modify a history record 120), can provide information for a history record. History records 120 can be created or modified, for example, when a user starts an application, when the user creates, modifies, or accesses new content using the application, when the user closes the application or particular content, or upon the occurrence of particular events in the application (e.g., saving a file, sending an email, printing a document).

In an example scenario, when a user watches a video, such as with a streaming video application or a website that provides streaming video, the application, or website, can call a method to create or modify a history record 120. The call can include as arguments information such as an identifier of the application or website (or application and website), an identifier associated with the user, an identifier associated with the video being watched by the user, a time the user accessed the video (or started the application), a duration the user watched the video, and the playback position when the user stopped watching the video (or when the call was made).

In other cases, history records 120 can be generated by another application, or an operating system component, that monitors a user's activities. For instance, a monitoring component may track what applications a user opens, the duration the application was open, the duration the user was actively using the application (e.g., using measures such as the duration the application was in focus in a user interface, or the primarily active application, or other measures of user activity, such as input provided to the application through a keyboard or pointing device), files opened, modified, or created by the user, and significant actions taken by the user in association with the application (e.g., printing a document or downloading a file).

Typically, a filtering mechanism is applied to user activity, or at least user activity reporting by a monitoring component, such that not all user activity results in a history record 120. That is, some user actions may not be significant, in the sense that they are not likely to be related to activities that a user would later like to review or resume. As an example, if a user opens, and then quickly closes, a series of files, it may indicate that the user is looking for a file having particular contents, and the opened and closed files are files that the user determined not to be the correct file. Thus, it may not be likely that the user would later want to review those activities (and, in fact, showing those activities may hinder the user in finding information they seek), and so they may not result in the generation of history records 120. However, after opening and closing a series of file, the user opened a file, printed the contents, and then quickly closed it again, that could indicate that the printed file was significant, and may be something the user would be interested in reviewing or resuming at a later date, and thus could be associated with a history record 120.

In some aspects, whether a history record 120 is created can depend, at least in part, on whether user actions can be associated with an existing activity 110. Typically, user actions are more likely to be relevant if they can be associated with a discrete activity 110 that the user has already carried out one or more times. For example, opening and closing a file may be more significant if the user has recently accessed the file on other occasions.

As will be further described, the present disclosure provides innovations for displaying information regarding a user's activities to the user, including individual instances (e.g., particular history records 120) when the user engaged in an activity 110. In some cases, more history records 120 can be created than are shown to the user. For example, a history record 120 may be generated and used to help determine the relevance of the activity 110 associated with the history record 120, or other history records. If a user accesses a document, even for a brief time, for instance, that may indicate that the activity 110 was somewhat more relevant to the user than other activities in which the user engaged during a relevant time period.

Activities 110 may be analyzed to determine which history records 120 to display to the user. For example, a user may only want to look at the most recent history record 120 for the top five most relevant activities 110 the user engaged in during a particular time period. Activity relevance can be determined, for example, using multiple history records 120 associated with the activity 110, even though the information eventually displayed to the user may be from only the most recent history record.

Each activity 110 can, but need not, be associated with one, or in some cases, multiple, tasks 130. A task 130 can represent a higher-level endeavor of the user that involves multiple activities 110. As an example, a task 130 may be a user preparing for an annual departmental review. As part of the annual review, the user may undertake activities 110 such as preparing a report, preparing a presentation, creating graphs and figures, and emailing colleagues. If desired, tasks 130 and activities 110 can have additional levels of organization. For example, preparing a report can also be a task 130, with preparing the report document and preparing graphics, figures, and images for the report all being underlying activities 110.

Task Records, Activity Records, and History Records

Figure 2:
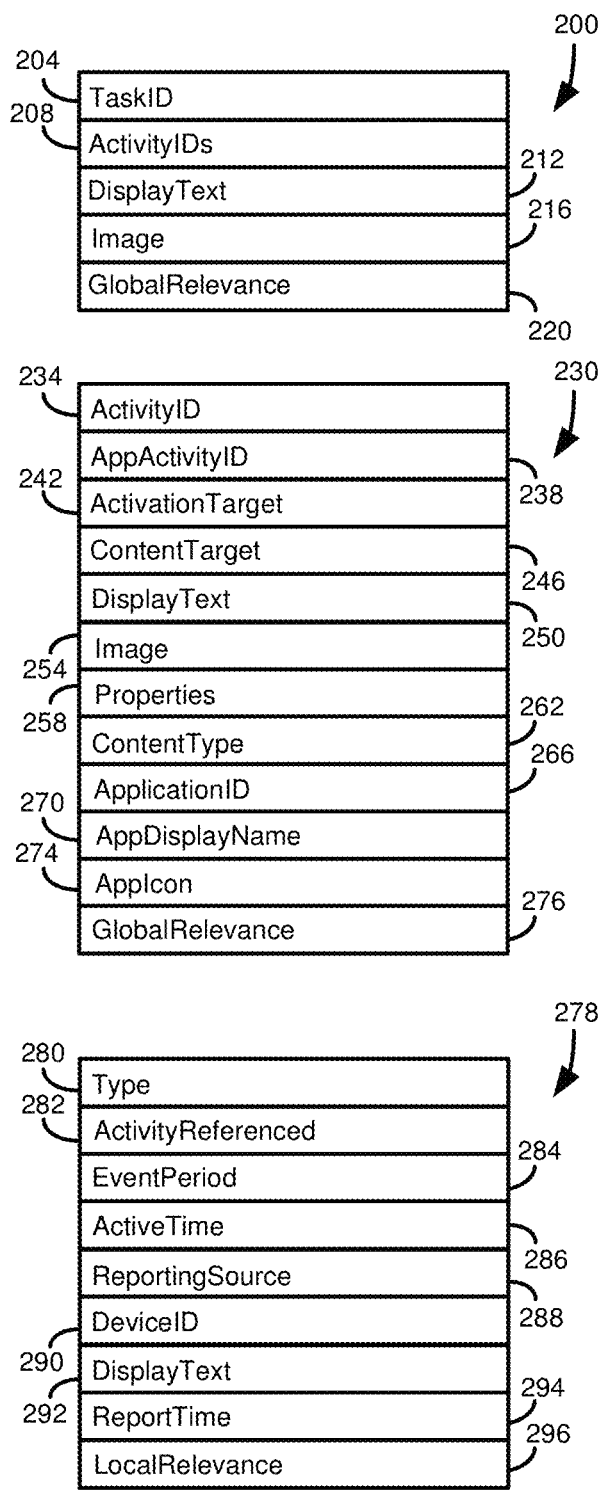
FIG. 2 is a diagram illustrating data that can be included in task records, activity records, and history records summarizing user activity on one or more computer devices.

FIG. 2 illustrates various properties that may be included in a task record 200, such as a record for the task 130 of FIG. 1. In particular examples, a task record 200 can be implemented as an abstract or composite data type, such as a class or a struct.

Each task record 200 is typically associated with a unique task identifier 204 ("TaskID"), such as an integer value. The task identifier 204 can be used by programs, or a computer device running a program, to uniquely name and identify a particular task. Each task record 200 can include one or more activity identifiers 208 ("ActivityIDs") that identify unique activities that are associated with the task record. In a particular example, the activity identifiers 208 can be one or more integers (e.g., an integer identifier for each component activity of the task record 200). In some cases, the activity identifiers 208 can include task identifiers 204 for other tasks 200. In this way one task can be a parent task to one or more additional tasks (which are, in effect, subtasks of the main or parent task).

Each task record 200 can be associated with text 212 ("DisplayText") to be displayed to identify or describe the task. The text 212 can provide a human-readable description of the task. In some cases, the text 212 can supplied by a user, in other cases, default text can be supplied, such as based on the nature of one or more activities associated with the task record 200. Similarly, each task record 200 can be associated with an image or an icon 216 ("Image," which can specify a file path for an image file), which can be assigned by a user or can be supplied automatically by a program (e.g., a program providing for creation and management of task records 200, or by a program that supplies information for a task record, an activity, or an individual history record of an activity, such as through an API). In a specific example, the image 216 can be an image of one or more content items associated with an activity of the task record 200.

Each task record 200 can also include a global relevance indicator 220 ("GlobalRelevance"). The global relevance indicator 220 can be a value representing the predicted or estimated relevance, or importance, of a task 200 to a user relative to other tasks the user may have contemporaneously engaged in (e.g., during a time within the period defined by the earliest and latest history records of an activity associated with the task, bound by the earliest and latest history records over a time period, or at another selected time period that embraces the task and one or more additional tasks). The global relevance indicator 220 can be used, for example, to rank task records 200 by relative importance. In at least some aspects, the global relevance identifier 220 can rank tasks 200 by relevance across multiple computer devices (e.g., an activity on a smartphone can be ranked relative to an activity on a desktop computer).

The task record 200 can include more, less, or different information than shown in FIG. 2. For example, the task record 200 can include information that is extracted from information that is maintained for activities associated with the task record, or with their underlying history records. The information can include identifiers for applications or computer devices use to carry out the task associated with the task record 200. In some cases, instead of, or in addition to the global relevance identifier 220, a task record 200 can have a field having one or more values representing predicted or estimated relevance, or importance, of a task record 200 relative to other tasks carried out on particular computer device(s) (e.g., a local relevance identifier).

FIG. 2 also illustrates various properties that may be included in an activity record 230, such as record for an activity 110 of FIG. 1. In particular examples, activity records 230 can be implemented as an abstract or composite data type, such as a class or a struct.

Each activity record 230 is typically associated with a unique activity identifier 234 ("ActivityID"), such as an integer value. The activity identifier 234 can be used by programs, or a computer device running a program, to uniquely name and identify a particular activity. The activity identifier 234 can be used to as the source of the activity identifiers 208 of a task record 200.

Each activity record 230 can include an application activity identifier 238 ("AppActivityID"). The application activity identifier 238 can be supplied to an application associated with the activity record 230 and can allow the application to identify the indicated activity, such as to resume the activity. Thus, the application activity identifier 238 can represent state or context information of the application, and can be referred to as activation information.

In at least some cases, the application activity identifier 238 can be supplied by an application that was used to carry out the activity associated with the activity record 230. For instance, for a video application, the video application may create an identifier than indicates a particular video a user was watching, and the playback position within the video. If the activity associated with the corresponding activity record 230 is selected to be resumed, the application can be provided with the application activity identifier 238, which the application can use to locate and resume the user's prior session.

Each activity record 230 can also include an activation target identifier 242 ("ActivationTarget"). The activation target identifier 242 can be used to locate, such as to execute, a particular application associated with the activity record 230. In some cases, the value of the activation target identifier 242 can identify a specific application, such as a specific application on a particular computer device (e.g., a file path for an executable file associated with the application).

In other cases, the value of the activation target identifier 242 can be used to identify a particular application, but not a specific application on a specific computer device. For instance, if a user has a desktop computer, a laptop computer, a tablet computer and a smartphone, in some cases, the value of the activation target identifier 242 can identify a specific application of a specific computer device, such as the laptop computer. In other cases, the value of the activation target identifier 242 can identify a particular application, such as a particular media player, and the activated application can depend on the identity of the device on which the activity record 230 is located, or the device from which the activity of the activity record 230 is to be resumed. That is, if the activity for the activity record 230 is selected from the tablet computer device to be resumed, the application for the tablet computer device can be executed, while the application for the desktop computer is executed if it is used to resume the activity. In some cases, a disambiguation service can translate the activation target identifier 242 to indicate a particular application (e.g., the location of an executable file) based on the identity of the device from which the activity is to be resumed. In some cases, if an activity 230 is to be resumed at a device, and the necessary application is not installed on the device, the appropriate application can be determine and installed, or the user can be prompted to install the application.

The activity record 230 can include a content identifier 246 ("ContentTarget") that can be used to identify a particular content item (e.g., document file, video file, music file, image file, web page, etc.). In some cases, this information can be independently maintained by the associated application, such as in association with a session or context information indicated by the application activity identifier 238. However, in some cases, an activity record 230 may not have a value for the application activity identifier 238, or the value may not be sufficient to resume the content using the appropriate application. As an example, for activities created through monitoring of user actions, rather than activities directly created by an application (e.g., through an API), the associated application may not have state information that can be accessed by a value of the application activity identifier 238. If the monitoring that created the activity record 230 is able to determine the content used by the application as part of the activity, an identifier of the content (e.g., a file location or web address) can be stored as value of the content identifier 246.

Even if an application includes state information that can be accessed by a value of the application activity identifier 238, the activity record 230 can still include the content target identifier 246. For instance, before an activity is resumed after being selected by a user, it can be determined whether the content associated with the content target identifier 246 is available. If the content is not available, the user can be presented with an error message, presented with an option to manually locate the content, or the content can be automatically located and downloaded to the computer device (including automatically when a device receives an activity record 230 referencing content not present on the device). Or, the value of the content target identifier 246 can be used to access the content to provide an image or preview of the content.

A human-readable title 250 ("DisplayText") can be included in the activity record 230. In some cases, the title 250 can be selected by a user. In other cases, the title 250 can be automatically provided, such as by an application through an interface or by a software component that creates and edits activity records 230. Any default or automatically assigned value for the title 250 can be changed by a user.

An image identifier 254 ("Image") can be used to identify an image (e.g., by a file path) that is associated with the activity record 230. In some cases, the image identifier 254 does not include a value. If the image identifier 254 is empty, no image is associated with the activity, in some aspects. In other aspects, if the image identifier 254 is empty, a default image, such as a content preview using the value of the content target identifier 246, or an image or icon of the application associated with the activity record 230, can be used as an image to be displayed in conjunction with other information of a particular activity record 230.

Properties data 258 ("Properties") can be used to store additional information associated with an activity record 230. For instance, the properties data 258 can include additional information to be supplied to an application to resume a prior state of the application and the relevant content, such as settings for the application. In particular cases, the properties data 258 can be stored as key-value pairs, with the key indicating a particular property or variable and the value indicating the value that should be supplied for the property or variable.

An activity record 230 can be associated with a content type, such as a document, a web page, audio, video, photos, and the like. The content type can be indicated by a content type identifier 262 ("ContentType"). The value of the content type identifier 262 can be used, for example, to sort activity records, or to allow activity records 230 to be searched by content type.

Each activity record 230 can be associated with a particular application, indicated using an application identifier 266 ("ApplicationID"). In some cases, the application identifier 266 can be used to indicate a specific application on a specific computer device, or an application on a specific type or class of computer device (e.g., pc, tablet, smartphone). In other cases, the application identifier 266 can be used to indicate a specific application (e.g., a specific music playback program), but is not specific to a particular computer device. Each activity record 230 can also include a human-readable name 270 ("AppDisplayName") for the application, and an icon 274 ("AppIcon") representing the application.

Each activity record 230 can include a global relevance identifier 276 ("GlobalRelevance"). The Global Relevance identifier 276 can be a value representing the predicted or estimated relevance, or importance, of an activity to a user relative to other activities that a user may have contemporaneously engaged in over a time period. The global relevance identifier 276 can be used to rank activities carried out by a user on different computer devices. In some case, instead of, or in addition to, the global relevance identifier 276, an activity record can include a local relevance identifier, indicating the relevance of the activity at one or more specific computer devices (e.g., a value for instances of the activity carried out using a smartphone and a value for instances of the activity carried out at a desktop computer).

Activity records 230 can include more, less, or different information than shown in FIG. 2. An activity record 230 can include information that associates the underlying with more than one application. For instance, a user may carry out the activity using one program (e.g., a particular word processing program) on their laptop, but a different program (e.g., a different word processing program) on their tablet computer. The activity record 230 can store information sufficient for the activity to be resumed using the appropriate application for a particular computer device.

As discussed above, an activity (and an activity record 230 therefor) can be associated with one or more history records, representing a distinct occasion or period where a user was engaged in the activity, or a significant action or event associated with the activity. FIG. 2 illustrates various properties that may be included in a history record 278. In particular examples, history records 278 can be implemented as an abstract or composite data type, such as a class or a struct.

History records 278 can be created by different entities (e.g., components of different devices, or different components for a single device) and for different reasons. Accordingly, each history record 278 can include a type identifier 280 ("Type"). Values of the type identifier 280 can signify or memorialize when a user starts a new activity, when a user finishes an activity, periods during which the user actively engaged in an activity, significant user actions regard the activity (e.g., sending a text or email, sharing a document, printing a document, downloading a file, maximizing a window) or events within the activity (for example, for a game, finishing particular quests or levels). As will be further described, some history records 278 can be generated by an application (e.g., by calling an API that allows the application to create, retrieve, or modify history records, which can be associated with state information maintained by the application regarding the history records), and thus applications can have at least some flexibility to define history records types that are relevant to the particular application. Other types of history records 278 can be generic, or default, and can include history records that can be generated by monitoring user activity, without requiring specific input from an application.

Each history record 278 is associated with a particular activity 230 using an activity identifier 282 ("ActivityReferenced"), which can, for example, store the value of the activity identifier 234 of the appropriate activity record 230. For certain types of history records 278, such as those designated by an application, or a monitoring component, as being "new," the creation of the history record 278 can trigger the creation of a new activity record 230, with the value of the activity identifier 282 of the new activity record being stored as the activity identifier 282.

Each history record 278 can include a time period identifier 284 ("EventPeriod"). In some cases, the time period identifier 284 can include start and end times for the particular user action(s) associated with a particular history record 278. In other cases, the time period identifier 284 can be a duration, such as number of hours, minutes, and/or seconds for which the user engaged in the activity, at some level. If the time period identifier 284 measures a duration, the history record 278 can include another field that records the time the user began the activity reflected in the history record.

Each history record 278 can also include a measure of the time the user was actively engaged in an activity, as opposed to perhaps having an application running, but not actively engaging with the application. This value can be recorded in an active time identifier 286 ("ActiveTime"). The amount of time a user was actively engaged in an activity can be supplied by a reporting application, such as when a history record 278 is created or modified in response to a call by an application, such as to an interface. If the application does not provide a value for the active time identifier 286, or if the history record 278 is created by monitoring user activity, the active time can be determined, for example, by tracking how long the associated application is in focus in a user interface and monitoring user input to the application, such as using a keyboard or a pointing device.

As history records 278 can be created by difference sources, such as a monitoring component or an application, or can be received from another device or a central repository, history records can include a reporting source identifier 288 ("ReportingSource"), indicating what entity was responsible for creating the history record. Similarly, a device identifier 290 ("DeviceID") can be included to indicate on which device the activity associated with the history record 278 occurred.

In at least some cases, at least some individual history records 278, as opposed to summarized information in an activity record 230, can be displayed to a user. A title 292 ("DisplayText") can include text to be displayed to a user in association with the history record 278.

Each history record 278 can be associated with a time in which the history record was created, or, in some cases, updated, such using a report time identifier 294 ("ReportTime"). The value of the report time identifier 294 can be used, among other things, to determine how immediate or recent the history record 278 is. If the value of the report time identifier 294 is recent, it may be more likely that the history record 278 will be updated than if the value is further in the past.

As an example, an application may create a history record 278 indicating that the user is engaging in an activity. The use may be ongoing, and so the duration initially in a history record 278 may be from a period from when the user initiated the activity to a time when the history record 278 was created. Later, the user may stop using the application, and the application may update the history record 278 to reflect the actual time the user spent engaging in the activity. Thus, history records 278 created on a previous day, for example, may be much less likely to be updated than history records created with the past few minutes or hours.

As with task records 200 and activity records 230, history records 278 can have a relevance value that can be used to compare an activity record with other activities (or particular activity records thereof) a user was contemporaneously engaged in. In at least some cases, as individual instances of an activity are carried out on a single computer device, a history record 278 can include a value of a local relevance identifier 296 ("LocalRelevance") indicating the comparative relevance of the activity instance to other activities on the same computer device. By comparing history records 278 for multiple devices, a global relevance value, across multiple computer devices, can be determined and associated with a task record 200 or an activity record 230. However, in other implementations, a global relevance value can be determined for individual history records 278.

Collections of tasks records 200, activity record 230, and history records 278 can be maintained in a suitable data structure (e.g., queues, lists, heaps, stacks, binary search trees, graphs, and the like). As will be further described, such data structures can be searched for members meeting particular criteria, which can then be rendered for display.

Example Architecture for Capturing and Displaying User Activity Information

Figure 3:
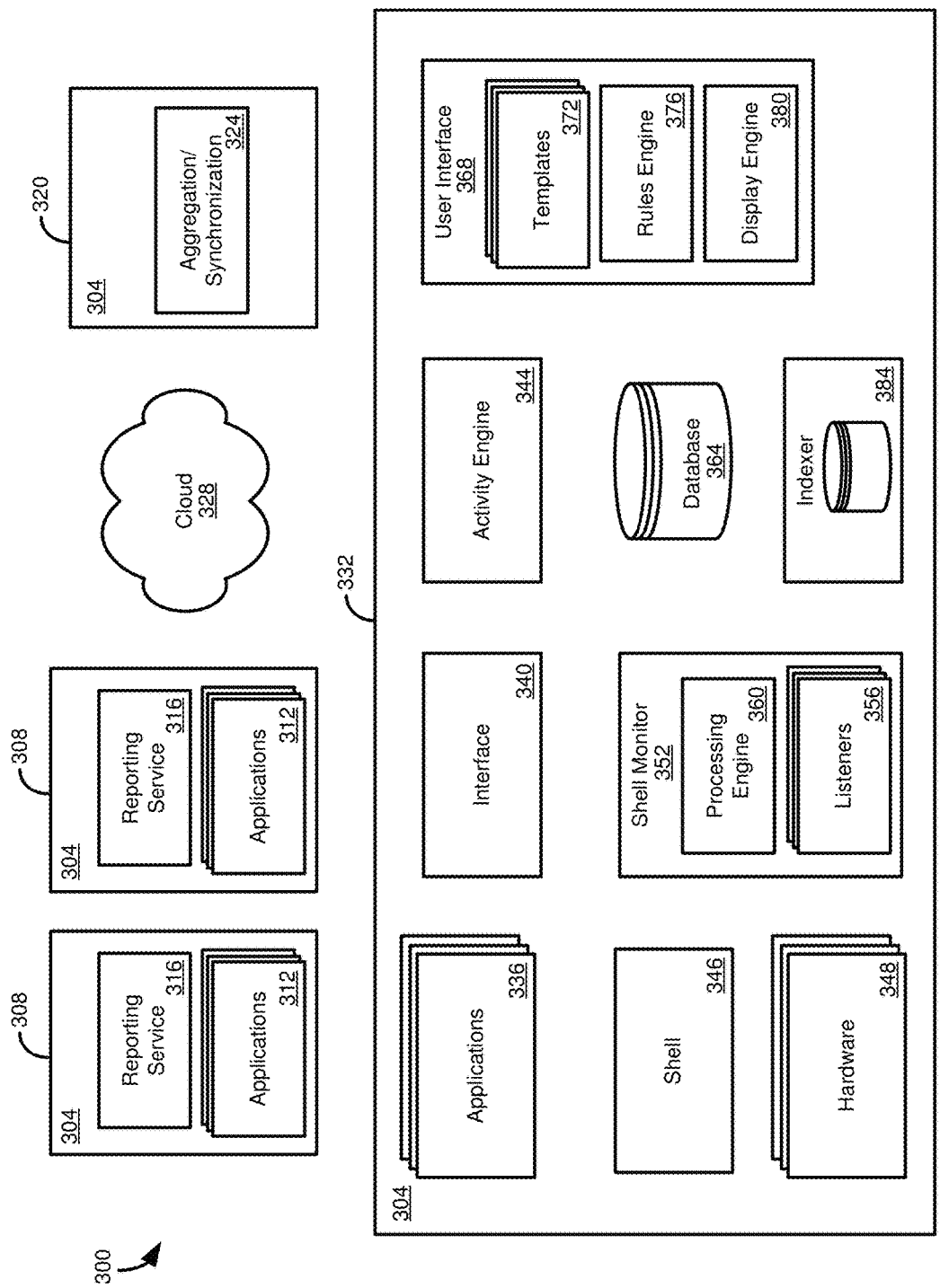
FIG. 3 is diagram of an example architecture in which the described innovations can be implemented.

FIG. 3 illustrates an example architecture 300 that can be used to implement innovations of the present disclosure. The architecture 300 includes a plurality of computer devices 304. The computer devices 304 can include, for example desktop computers, laptop computers, tablet computers, smartphones, game consoles, smart televisions and appliances, and wearable technologies, such as smartwatches and smart glass. The computer devices 304 can include lightweight or heavyweight implementations of user activity monitoring or reporting, and user interfaces for accessing the results thereof.

For example, computer devices 308 include lightweight implementations of user activity monitoring or reporting. Each of the computer devices 308 can include a plurality of applications 312. A reporting service 316 can collect information reported by the applications 312, such as through an interface, and send it to a computer device 320 hosting an aggregation/synchronization component 324. The computer devices 304 can be connected through a network or cloud 328. In some cases, the reporting service 316 can also send information to other computer devices 304, including those that include heavyweight implementations of user activity monitoring or reporting, such as computer device 332. The reporting service 316 can allow applications 312 to make various calls to an interface, such as an interface that provides for the creation or modification of information regarding user activity, including information stored in one or more of task records, activity records, and history records (e.g., the task records 200, activity records 230, and history records 278 of FIG. 2).

The aggregation/synchronization component 324 can collect user activity information, or data, from one or more of the computer devices 304. The collected information may be used to update user activity information stored on one or more of the computer devices 304. For example, the computer devices 308 may represent mobile devices, such as smartphones or tablet computers. Computer device 332 may represent a desktop or laptop computer. In this scenario, the aggregation/synchronization component 324 can send information regarding the mobile devices 308 to the desktop/laptop 332, so that a user of the desktop/laptop can be presented with a comprehensive view of their activity across all of the computer devices 304. In other scenarios, the computer devices 308 may also be sent information regarding user activities on other computer devices 304, including the computer device 332.

The aggregation/synchronization component 324 can carry out other activities. For instance, the aggregation/synchronization component 324 can supplement or augment data sent by one computer device 304, including with information sent by another computer device. In some cases, the aggregation/synchronization component can associated history records for an activity with a task having another activity carried out using another of the computer devices. The aggregation/synchronization component 324 can also resolve conflicts between data received from different computer devices 304 (for instance, using a rule that prioritizes activity data from different devices, prioritizes activity data based on when the activity data was generated, prioritizes activity data based on a reporting source, such as a particular application or shell monitor component), such as if two computer devices include history records for the same activity at overlapping time periods. For example, if a user was listening to music on two computer devices 304, the playback position in the same content may differ between the devices. The aggregation/synchronization component 328 can determine the appropriate playback position to associate with the activity. Thus, the aggregation/synchronization component 324 can determine "true" data for an activity and can send this information to one or more of the computer devices 304, including a computer device on which the activity was not carried out, or updating data at a device where the activity was carried out with the "true" data.

Turning to the heavyweight implementation of the activity monitoring/reporting/information service on the computer device 332, the computer device can include a plurality of applications 336. The applications 336 can directly create and modify tasks, activities, and history records through an interface 340. The interface 340 can provide access to methods of an activity engine 344, which can create or modify task records, activity records, and history records.

In addition to user activity information received directly from the applications 336 through the interface 340, the computer device 332 can receive user activity information through monitoring user activity, such as user activity associated with the shell 346 (e.g., an interface to services provided by an operating system of the computer device 332). Information associated with the shell 346 can include interactions with hardware devices 348, such as secondary storage devices, printers, pointing devices, keyboards, and other accessories. Interactions can include, for example, creating, opening, or closing a file, pointing activity (e.g., mouse clicks and cursor manipulation), keyboard input, and commands to print a document.

Shell activities can be monitored by a shell monitor component 352. The shell monitor component 352 can include listeners 356 for various user actions, such as listeners for hardware actions, listeners for keyboard or pointing device input, listeners for network activity, listeners for calls to the audio or video systems of an operating system, listeners for determining open and in-focus applications, and the like.

The shell monitor component 352 can further include a processing engine 360. The processing engine 360 can analyze the various user actions to associate the actions with particular applications 336 and to create history records that are provided to the activity engine 344. The activity engine 344 can associate the history records with appropriate activities or tasks, or create new activities or tasks as appropriate.

The activity engine 344 may also be in communication with the aggregation/synchronization component 324, and optionally the computer devices 308. Information regarding tasks, activities, and history records created on the computer device 332, or received from the aggregation/synchronization component 324 or the computer devices 308, can be stored in a database 364. In at least some aspects, the database 364 serves to cache a portion of the information of the aggregation/synchronization component 332, where the aggregation/synchronization components remains the authoritative repository of activity information. In other aspects, the database can include additional functionality.

The database 364 can periodically be garbage-collected, such as to remove user activity information older than a particular threshold date, or relating to activities in which the user has not been actively engaged for a period of time. In some cases, rather than being garbage-collected, or at a stage prior to being garbage collected, individual records can be combined or merged. For example, all relevant history records can be maintained for recent user activity. For older user activity, individual history records can be combined- such as combining individual history records for a day into a single history record, combining all history records for a week into a single history record, etc. Entries older than a particular threshold can simply be deleted.

The computer device 332 includes a user interface 368 that can allow a user to view information regarding their activities, and optionally resume activities, access content associated with activities, or modify task records, activity records, or history records. The user interface 368 can include one or more templates 372 specifying various ways the user may view or interact with activity information. The user interface 368 can also include a rules engine 376, which can determine the appropriate content to provide for a particular template 372 in response to a particular user request. A display engine 380 of the user interface 368 can render displays for output based on the templates 372 and, at least for some templates, data specified by the rules engine 376.

In some cases, the computer device 332 can include an indexer 384. The indexer 384 can index information regarding tasks, activities, and history records of the database 364, such as to improve performance of the user interface 368 by making data for populating a template 372 more readily available.

The architecture 300 can include more or fewer components than shown, and may be organized in other manners. For example, functionality of a particular component can be carried out by another component. In addition, in at least some cases, functionality can be carried out using multiple components. At least certain functionality shown as occurring at the computer device 332, such as the functionality of the processing engine 360 or the activity engine 344, can be carried out at the aggregation/synchronization component 324.

User Activity Summary Display

Figure 4:
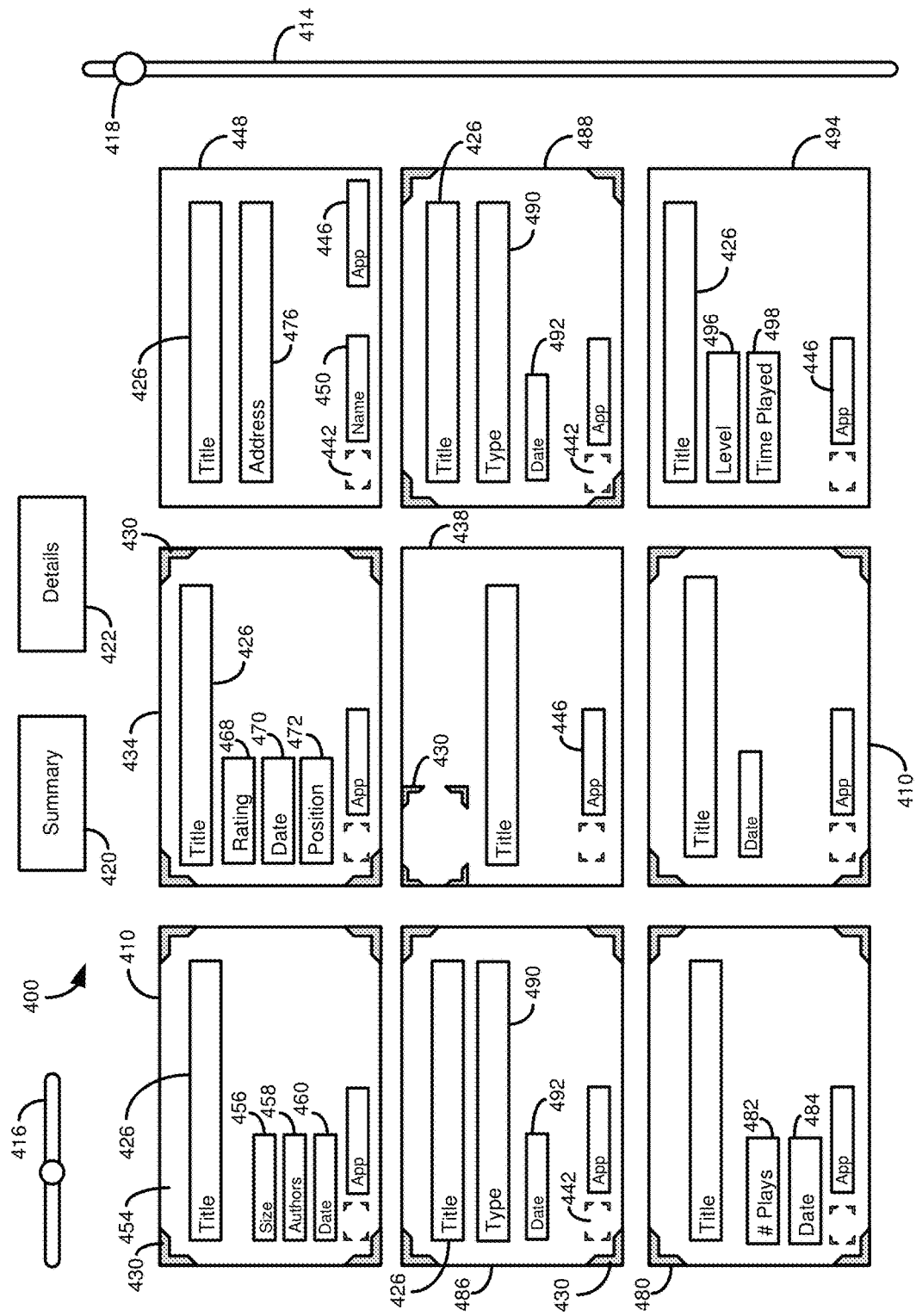
FIG. 4 is an example screen displaying a summary of a user's activities.

FIG. 4 illustrates an example user interface display 400 that can be used to present a user with information regarding their activities. The display 400 can be one of the templates 372 of the user interface 368 of FIG. 3, and can be populated using the rules engine 376 and the indexer 384.

The display 400 presents a plurality of activity representations 410. Each activity representation 410 provides information about an activity in which the user engaged in over a period of time. The activity representations 410 can provide information corresponding to a single instance of the activity (e.g., corresponding to a single history record) or can include information derived from multiple instances of the activity (e.g., information from multiple history records associated with the same activity).

The display 400 can represent a summary view of user activity, where only the most relevant activities over a time period are displayed. In at least some implementations, the display 400 can include activities carried out at multiple computer devices, including a computer device other than the computer device on which the display is rendered. Although not shown, if desired, an activity representation 410 can display an indicator of which device the activity was carried out on, or can otherwise be displayed in a manner to provide such information.

In some cases, the time period can be adjusted, such as using user input, such that a particular screen state (e.g., corresponding to a position on a timeline, such as represented by a position on a scrollbar 414) represents a longer or shorter time windows. Longer time windows may include a larger number of activity representations 410. If the window is larger, and includes a larger number of activity representations 410, the size of the activity representation can be made smaller to accommodate a display of more activity representations on the display 400. Or, the size of the activity representations 410 can be maintained, but the number of relevant activity representations, such as by showing only activity representations meeting a higher threshold relevance level. In some cases, a user interface element, such as scrollbar 416, can be provided to allow a user to change the relevance criteria used to select activity representations 410 to include in the display 400.

The activity representations 410 can be positioned on the display 400 in a particular order. In some cases, the order can be chronological (e.g., chronological or reverse-chronological). In other cases, the order can be based on relevance, with more relevant activity representations 410 being listed before less relevant activity representations. When activity representations 410 are listed in an order, the order may be defined as desired. In particular examples, activity representations 410 are listed in the order from left to right, and then from top to bottom. For instance, for reverse-chronological order, the most recent activity representation 410 would be placed at the top left corner of the display 400, and additional activity representations would be placed in the row left to right accordingly to their recency. Once a row is filled, the process would be repeated starting at the leftmost position of the next lower row.

The scrollbar 414 can including a positional indicator 418, indicating a currently displayed timeline position or value. A user can select the indicator 418 and adjust its position to view more or less recent activity representations 410, such as by clicking and dragging the indictor, or though other input using a pointing device, keyboard, or other input device. The activity representations 410 displayed on the display 400, as well as their position, can change as the position of the indicator 418 changes.

A user may be given the option to view their activities in another format (e.g., using another template 372). The user may be given the option to select the current, summary, view (e.g., the display 400) using an icon 420, and an alternative view, such as a detail or verbose view providing a view of more, including all, of the user's activity by selecting an icon 422.

In some cases, a user can select to resume an activity associated with an activity representation 410 (or an activity representation provided in another display or interface of the present disclosure) by selecting (e.g., clicking or an analogous input) an activity representation or a particular portion of an activity representation. Resuming an activity can include launching an application associated with the activity representation 410, loading relevant content, and resuming a prior state of the application with respect to the context. Resuming an activity can include resuming the activity at a computer device other than the device on which the display 400 is presented (e.g., an application may be launched on a smartphone when a user selects an activity representation 410 displayed on a desktop computer). Or, resuming an activity can include resuming the activity on a computer device other than the device on which the activity was originally, or last, carried out (e.g., an activity last carried out on a smartphone can be resumed on a desktop computer). When the activity is resumed on a different computer device, resuming the activity can include one or more of installing an application on the computer device where the activity will be resumed, transferring content to the computer device where the activity will be resumed, and transferring application state information to the computer device where the activity will be resumed.

The display 400 can display a variety of information in each activity representation 410. Each activity representation 410 typically include a title 426. The title 426 can be the value specified by the title 250 of FIG. 2 (or, in other cases, the value specified by the titles 212 or 292), which can be a default value, or can be supplied in another manner (e.g., a default value that is not specified by value of the title 250). The title 426 can vary depending on the type of application or content associated with the activity representation 410.

Activity representations 410 can optionally include a displayed image 430 that is associated with the activity of the activity representation 410 (e.g., the image specified by fields 254 or 216 of FIG. 2). In some cases, such as in activity representation 434, the image 430 can form the background of the activity representation (e.g., being displayed behind the entire display area used to display information regarding a particular activity representation 410). In other cases, such as in activity representation 438, the image 430 can occupy less than all of the display area used to display information regarding a particular activity representation 410. In some cases the image 430 can be a single static image, in other cases, the image can change between different images, or can include a short video or animation.

Typically, an activity representation 410 includes information regarding an application used (or useable) to engage in the activity associated with the activity representation. For example, the activity representations 410 can include an icon 442 (e.g., an image, such as specified in field 274) representing, or otherwise associated with, the application. The name 446 (e.g., the name specified in field 270) of the application can also be displayed on the activity representation 410. In at least some cases, such as in the case of an activity representation 448 associated with web browsing activity, the image 430 can represent a web page associated with the web browsing activity of the activity representation (e.g., an image extracted from or otherwise associated with a particular website represented in the activity representation), and, in addition to the name of the application, a name 450 of the website (e.g., a host name, which may be stored, for example, in the Properties field 258) can be displayed on the activity representation. In particular aspects, the web page icon or image 430 and the web page name 450 are extracted from metadata associated with the webpage (and may correspond, for example, to an image and name displayed in a title bar of the web browser when the user visited the web page).

Activity representation 454 can represent activity involving a document, such as a presentation document, a word processing document, or another type of document. The title 426 of the activity representation 454 can be the name of a file corresponding to the document, optionally including the file path. The activity representation 454 can provide details regarding the file, such as its size 456, one or more authors 458 of the file, and a date 460 the file was created or last modified. While activity representation 454 is not shown with an image 430, in at least some cases, the activity representation can include an image, which can be, for example, a portion of the contents of a document associated with the activity representation.

Activity representation 434 can represent a user viewing a video. The title 426 can be the name of the video (e.g., a name of a movie or a television program). The activity representation 434 can include additional information regarding the video, such as a rating 468 (for instance, an MPAA rating, a popularity rating, or a critical rating), a date 470 the video was produced (or, alternatively, a date the video was last viewed), and a position 472 at which the user previously ceased viewing the video. The image 430 displayed with the activity representation 434 can be a frame of the video or a particular image associated with the video (e.g., equivalent to a movie poster).

Activity representation 448 can represent a website visited by the user. The title 426 can be a title of the web page (e.g., a title specified in metadata associated with the web page). The activity representation 448 can include additional information about the website, such as its address or URL 476. Although not shown, the activity representation 448 can include additional information about the web page, such as a date the user last visited the webpage or a time spent engaged with the website, which can be a total time spent engaged with the website or the time spent engaged with the website on the date the user last visited the webpage (which can be for a particular date, or for a particular interaction, such as a particular history record associated with the activity representation 448). As mentioned above, the activity representation 448 can include an icon 442 that is associated with a website visited as part of the web browsing activity of the activity representation 448, such as specified by metadata of the website. Although not shown, the activity representation 448 can include an image 430, such as an image of a visited webpage. The activity representation 448 includes, in addition to the address 476, a name 450 associated with the visited webpage and the name 446 of the application (e.g., a specific web browser) used to view the webpage.

Activity representation 480 can represent activity related to audio content, such as a user listening to a song or album. The title 426 of the activity representation 480 can be, for example, the name of the artist and/or name of the song/ album. The activity representation 480 can display additional information regarding the audio content, such as a number of times 482 the user played the content, and a date 484 the album or song was released. The image 430 displayed for the activity representation 480 can represent artwork designated for the musical content (e.g., corresponding to an album cover).

Some activity representations can relate to photographs viewed, or taken, by a user. For instance, activity representation 486 represents a single photo viewed by the user, while activity representation 488 represents a collection of photos, or a photo of a collection of photos, viewed by the user. The title 426 of activity representation 486 can be a file path for a photo, while the title of activity representation 488 can be a name of the collection. The activity representations 486, 488 can include type information 490, which can indicate whether the photo is an individual photo or a collection of photos. If the photo is from a collection, the number of photos in the collection can be displayed. The activity representations 486, 488 can also include a date 492, which can be a date the photo (or a photo of the collection) was taken, or a data the user last viewed the photo (or collection). The image 430 displayed in the activity representation 486 can be the photograph, and the image displayed in the activity representation can be a photograph of the collection or a collage of photographs in the collection.

Activity representation 494 can represent game play activity by a user. The title 426 of the game play activity representation 494 can be the name of the game. The activity representation 494 can display additional information about the game content played, such as a level or accomplishment 496 last achieved by the user, and a total time 498 spent by the user playing the game. Although not shown in FIG. 4, a game play activity representation 494 can include additional information, such as an amount of game content completed by the player to date, or a date the user last played the game. Although not shown in FIG. 4, the activity representation 494 for gaming activity can include an image 430, which can be, for example, a screenshot of the user's last session playing the game, or another image associated with the game (e.g., corresponding to packaging cover art for the game).

The display 400 can include additional user interface elements. For example, the display 400 can include a search element, where a user can enter search criteria to locate activity representations 410 meeting the search criteria.

Display of Current Applications and Prior User Activity

In some cases, information regarding past user activities can be presented in conjunction with information about activities the user is currently engaged in, which can help provide context for the user in locating information of interest to the user. Activities the user is currently engaged in can be, for example, applications the user currently has open. In at last some cases, a current activity can also be a past activity.

Figure 5:
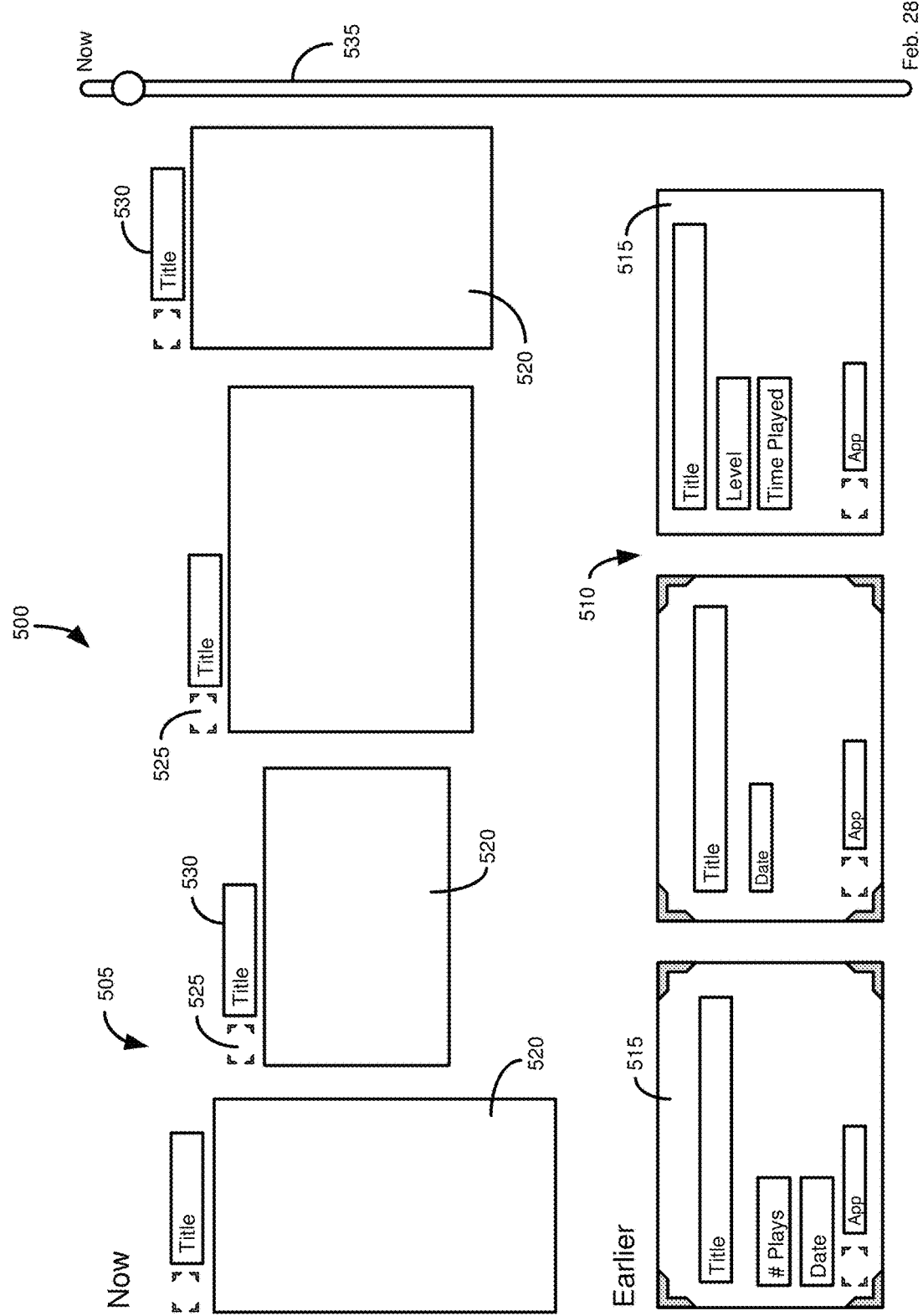
FIG. 5 is an example screen displaying a summary of current applications being executed by a user and prior user activity.

FIG. 5 presents an example display 500 having a section 505 display current user activity, and a section 510 displaying prior user activity. In at least some cases, the prior activity section 510 can include activity representations 515, which can be analogous to the activity representations 410 of FIG. 4. However, in other cases, the prior activity section 510 can include other types of activity information, including details for all activities, including all instances of an activity (e.g., corresponding to individual history records).

Current activity section 505 can, for example, present scaled representations 520 of each window corresponding to an application the user is running Each representation 520 can be presented along with an icon 525 associated with the application and a title 530. The icon 525 and title 530, at least in some implementations, may be selected as described for the title 426 and icon 442 of FIG. 4. In some cases, current activity section 505 can include applications being executed on the computer device on which the display 500 is rendered, which in other cases the current activity section can include applications being executed on other computer devices.

A user can scroll between current activities and past activities, including scrolling the current activity section 505 off screen in order to view additional (e.g., older) past activities using a scrollbar 535. In at least some cases, if the user manipulates the scrollbar 535 such the current activity section 505 is off screen, the display 500 can transition to the display 400. If the user scrolls such that the present time is reached, the display 400 can transition to the display 500.

The display 500 can include additional user interface elements. For instance, the display 500 can include an element that allows a user to adjust the granularity of the time period of the display (e.g., to summarize activity by day or week rather than by hour or minute). The display 500 can include an element that allows a user to adjust relevance criteria, such that a larger or smaller number of activity representations 515 are included in the display. The display 500 can include a search field, where a user can search for activity representations 515 meeting particular search criteria.

Detailed Display of User Activity

Figure 6:
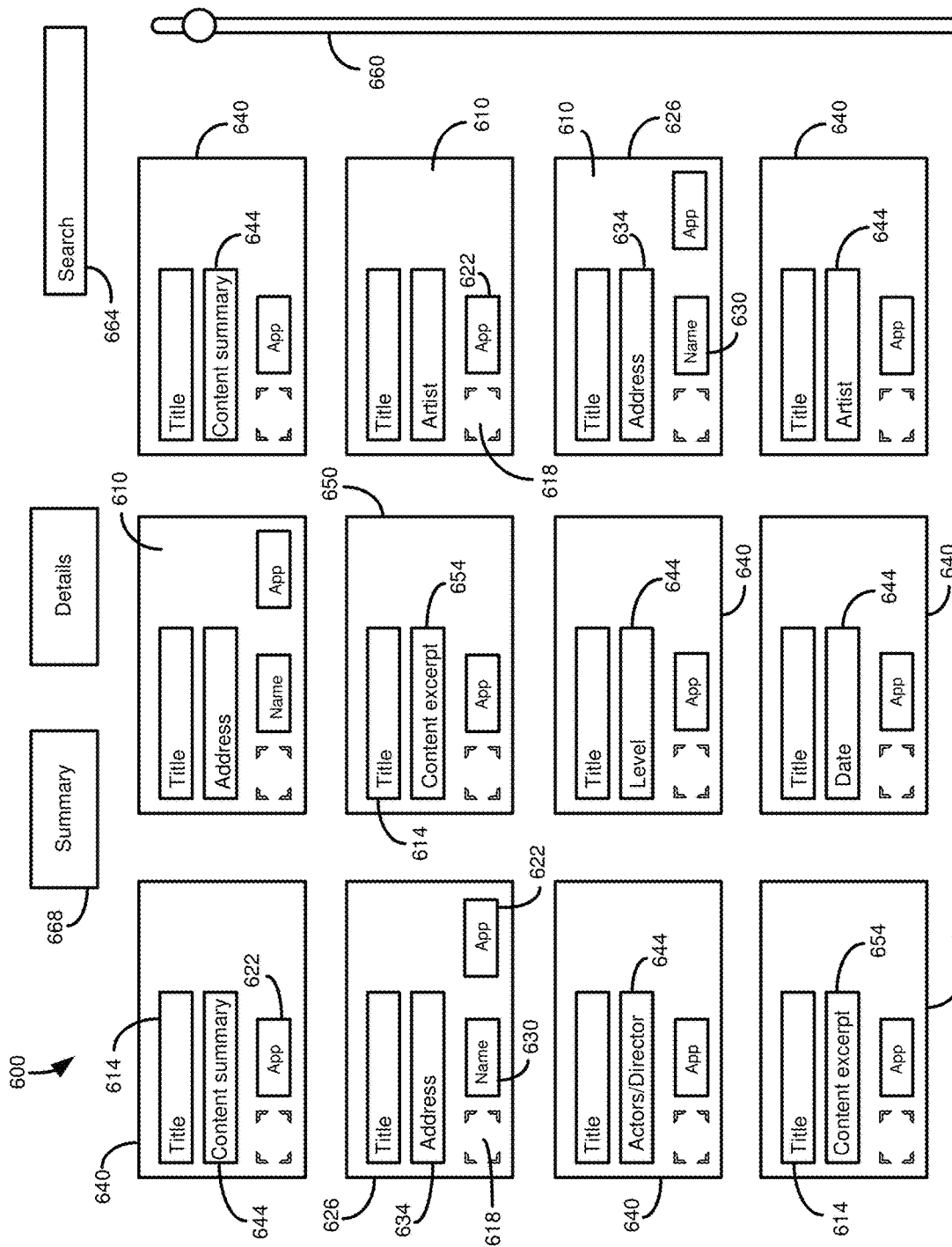
FIG. 6 is an example screen showing detailed user activity.

FIG. 6 illustrates an example user interface display 600 that can be used to present a user with information regarding all of their activities, including all instances in which a user engaged in an activity (e.g., information for all history records associated with each activity). The display 600 can be one of the templates 372 of the user interface 368 of FIG. 3, and can be populated using the rules engine 376 and the indexer 384. In particular aspects, the display 600 can be presented to a user in response to the user selection of the "Details" element 422 of FIG. 4.

While the display 400 presented activity representations 410 for a subset of the user's activities (and/or a subset of the history records for user activities), which can be useful in allowing a user to rapidly locate an activity of interest, in some cases, a user may wish to view a more complete record of their activities. For instance, the activity of interest may not have been selected as one of the activity representations 410 displayed on the summary display 400.

The display 600 can be different than the display 400 in one or more respects. The size of activity representations 610 can be smaller than the size of the activity representations 410. When significant activities are presented to the user, as in the display 400, it may be desirable to include a greater amount of information in the activity representation 410, for example, or to make the information larger or otherwise easier for a user to read. When all activities are presented to a user, it may be desirable to include less information on each activity representation 610, and/or condense the presentation of information, allowing the activity representations to be made smaller, so that a larger number of activity representations can be concurrently displayed to the user. Being able to concurrently view a large number of activity representations 610 can allow a user to quickly locate a particular activity, even if less information about the activity is immediately available to the user. Once the activity of interest is located by the user, the user can select the corresponding activity representation 610 to resume the activity or to obtain additional information regarding the activity. As with the display 400, in at least some cases, the activity representations 610 can represent activities carried out at computer devices other than the computer device used to render the display 600, and the activity can be resumed at the same computer device at which it was original, or last, conducted, or at a different computer device.

The order in which the activity representations 610 are presented to the user can differ from the order in which the activity representations 410 are presented to the user. For instance, while the activity representations 410 can be displayed in order of relevance, the activity representations 610 are typically presented in a chronological order (e.g., chronologically or reverse-chronologically). However, the activity representations 610 can be displayed in another order, if desired, including based on particular relevance criteria.

As discussed above, in at least some cases, the activity representations 610 can include less information than the activity representations 410. The information included in the activity representations 610 can be a subset of the information in the activity representations 410. However, if desired, the information displayed in the display representations 610 can include all of the information of the activity representations 410, or information not included in the activity representations 410.

As with the activity representations 410, the activity representations 610 are shown having at least some displayed information in common, including a title 614, an image or icon 618, and an application name 622 associated with an application used to carry out the associated activity. For the various types of activities (e.g., creating or editing a document, viewing a web page, listening to music, watching a video, etc.), the title 614, image or icon 618, and application name 622 can be displayed in an analogous manner as the title 426, image or icon 442, and application name 446 of FIG. 4.

Activity representations 626 can represent activity summaries for web browsing activity. In addition to the title 614, image 618, an application name 622, the activity representation 626 can include a name 630 associated with the website, which can be analogous to the name 450, and an address 634, which can be analogous to the address 476.

Activity representations 640 include a content summary field 644. The content summary field 644 can include information describing aspects of the content, such as the date a document or photograph was last accessed, modified, or created, a type (e.g., a document type, whether the content is a photo or a collection of photos), and the size of the content (e.g., disk or memory space occupied by the content). When the activity is a game, the content summary field 644 can list a level the user last played, or the last accomplishment achieved by the user.

Activity representations 650 include a content excerpt field 654. The content excerpt field 654 can include a portion of the content associated with an activity represented by an activity representation 650. In the case of a messaging, email, or other communications activity, the content excerpt field 654 can include a portion of the message, email, or other communication, such as a last message sent or received.

The display 600 can include a scrollbar 660, which can be used to scroll through the activity representations 610 according to forward and reverse progress in the display order. A user can search for results in the display 600 (or for activities, in general) by entering a search query in search field 664. A "Summary" display element 668 can be selected, which can, for example, cause the display 400 of FIG. 4 to be rendered.

Display of User Activity Search Results

Figure 7:
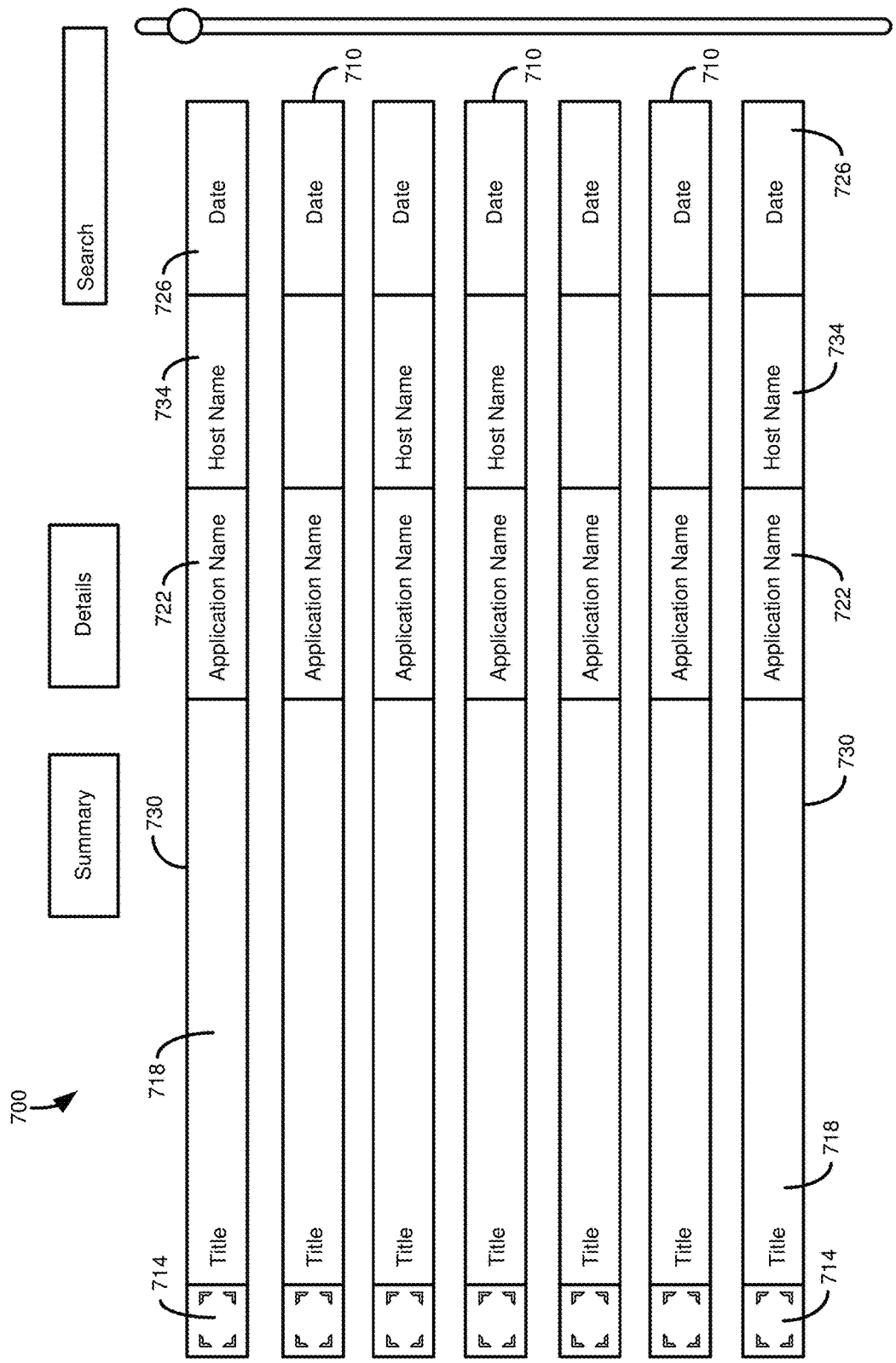
FIG. 7 is an example screen showing search results from a search of user activity.

The displays 400, 500, 600 of FIGS. 4-6 can allow a user to browse for information they are seeking, which is a preferred engagement method for many users. However, the disclosed innovations can accommodate another common information retrieval paradigm-searching. FIG. 7 illustrates an example search results display 700 that can be used to present a user with activities meeting one or more criteria specified by a user. The display 700 can be one of the templates 372 of the user interface 368 of FIG. 3, and can be populated using the rules engine 376 and the indexer 384. In particular aspects, the display 700 can be presented to a user in response to the user entering search criteria into the search field 664 of FIG. 6. In further aspects, the search results display 700 can be presented to a user in another manner.

The search results display 700 includes a plurality of search results 710, with each result corresponding to a particular history record for a particular activity. However, in other aspects, the search results display 700 can display information for activities (e.g., a summary or aggregation of individual history records), tasks, or a combination of history records, activities, and tasks. The display 700 can include various information regarding an activity or an activity instance represented by a search result 710.

As an example, the search results 710 of the display 700 include an icon or image 714 associated with an application used to engage in the activity. The icon or image 714 can be selected as described for the icon or images 442 and 618 of FIGS. 4 and 6. Similarly, the information displayed can include a title 718 and an application name 722, which can be selected as described for the corresponding elements of FIGS. 4 and 6.

A date 726 is displayed for each of the search results 710. The date 726 can be a specific date (e.g., a specific date and time when the user began or ended engaging in the corresponding activity), or can be specified at a coarser granularity, such displaying a calendar date or day of the week associated with the engagement, but not a specific time, or displaying a relative description of the time the user engaged in the activity (e.g., "earlier today," "earlier this week," "last month").

Different types of search results 710, corresponding to different types of tasks or activities, can include more, less, and different types of information. For instance, search results 730 can be for web browsing activity. The information for search results 730 can include the host name 734 of the browsed website.

The user may be allowed to take action regarding a particular search result 710. For instance, selecting a portion of a search result 710, such as the title 718, may initiate an attempt to resume the activity, including launching the relevant application with the relevant content. Or, selecting a portion of a search result 710, such as a portion of the search result other than the title 718, or hovering over the search result, may cause the display of additional information regarding the search result (e.g., a popup of an activity representation 410 or 610).

As with the display 400, in at least some cases, the search results 710 can represent activities carried out at computer devices other than the computer device used to render the display 700, and the activity can be resumed at the same computer device at which it was original, or last, conducted, or at a different computer device.

In some cases, the search results 710 are displayed in a chronological order (e.g., chronological or reverse chronological). However, the search results 710 can be displayed using different criteria to determine the order. For example, the search results 710 can be displayed in decreasing order of estimated or predicted relevance. Or, the search results 710 can be displayed in an order determined at least in part by an activity type, an application, an application type, or combinations thereof.

Highlighting of Relevant User Activities During User Interaction with Activity Display In addition to being used to generate particular displays, such as the activity summary display 400 of FIG. 4, relevance information for an activity (such as a duration a user actively engaged in an activity over a time period) can be used to help convey activity relevance as a user interacts with a display. For example, a user may be able to use an interface to scroll through activities according to a criteria, such as chronologically. As the user scrolls forward and backward in time, activities having different relevance values can be displayed differently. For instance, as a user scrolls, activities can be displayed for a duration that relates to their relevance value. In a particular implementation, activities are display for a duration that relates to an amount of time a user engaged in the activity over a time period. Thus, as a user scrolls, more relevant activities will be displayed for a longer period of time than less relevant activities.

Although more relevant activities can be displayed for a longer period of time, the position of the activities on the display can be altered, such as to provide a visual indication that the scrolling is moving towards the beginning or end of the activity. For a user scrolling backwards in time, short duration activities can be displayed for a short period of time, being removed from the display after only minor scrolling by the user. Longer duration activities can be displayed for a longer period of time, but can be migrated from a lower portion of a display to an upper portion of the display. The displayed movement can be reversed if the user changes to an opposite scroll direction.

In some cases, a fixed number of activities are displayed at any one time on a display. The rate at which shorter duration activities are added or removed from a display, and the duration that longer duration activities remain on the display, and optionally a degree of change to the display position (e.g., vertical position), can be calculated relative to the number of activities that are to be simultaneously displayed. That is, if a greater number of activities need to be displayed over a time period (or other scroll criteria), the rate they are added and removed may increase. If a smaller number of activities need to be displayed, activities can be added and removed from the display at a slower rate.

In some cases, activities are displayed for a duration that is tied to a start and end time for the activity. So, as long as the user is scrolling within values (e.g., a time window) that the activity was being undertaken, the activity will remain on the display. The relevance criteria used to select activities to be displayed can vary such that the maximum number of displayed activities is maintained. That is, if a display can render information for n activities, the relevance threshold can float so that the top n-most relevant activities are selected for display.

Display parameters may be altered in other ways to accommodate a particular display purpose. For instance, if all activity is to be displayed, the scroll increment (e.g., time unit) can vary to accommodate varying numbers of activities over time periods. That is, if there are many activities over a time period, the scroll increment unit can be decreased, and increased if fewer activities are to be displayed. Or, The scroll increment unit can be maintained, but the rate at which activities are added to, or removed from, the display can vary as the number of activities over a time period (or scroll unit) changes. That is, if many activities are available, they are rotated through the display more quickly than if fewer activities are available.

Figure 8A:
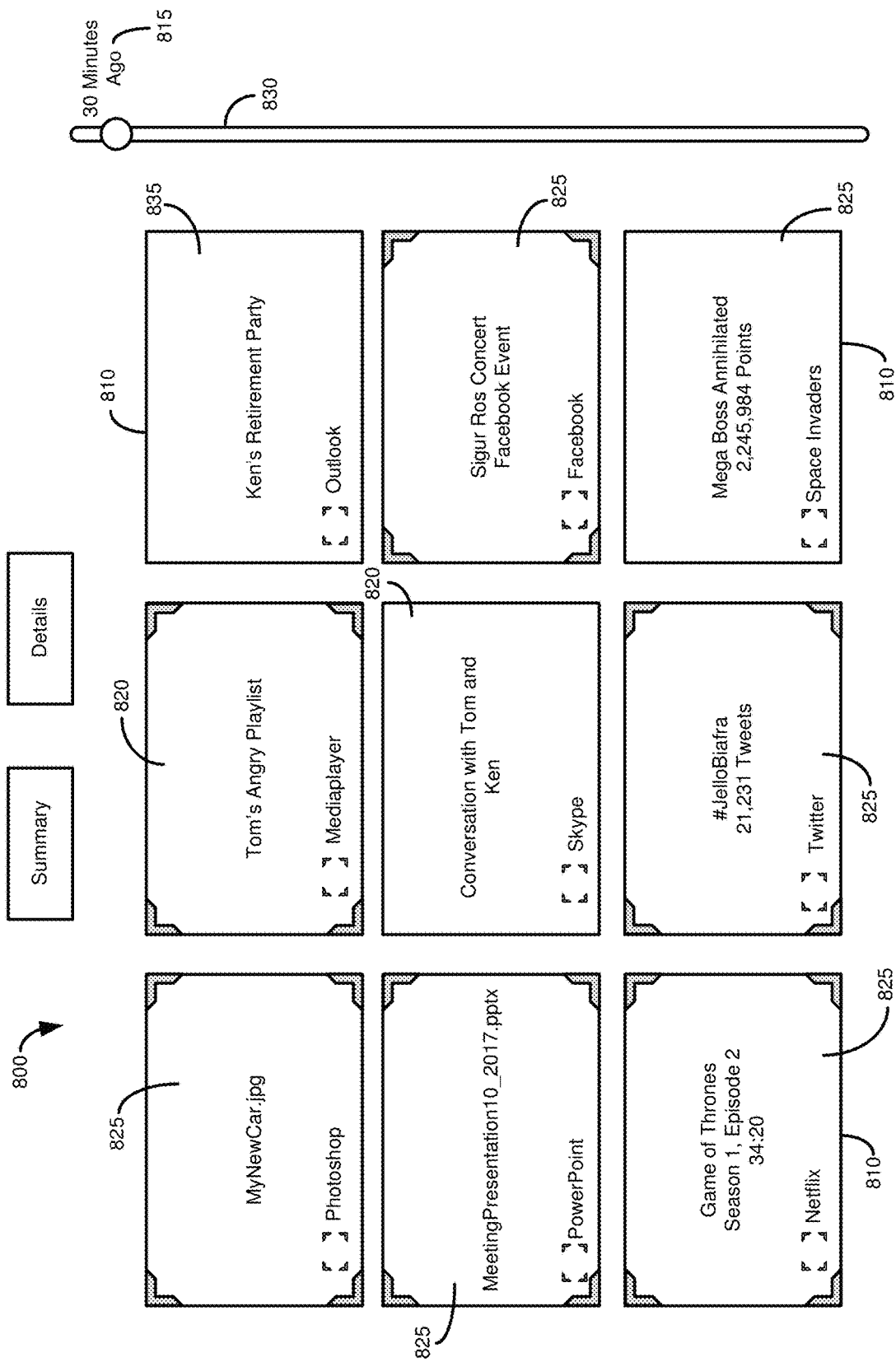
FIGS. 8A and 8B are example screens showing how activity relevance information may be used to highlight activities during user interaction with a display of user activity.
Figure 8B:
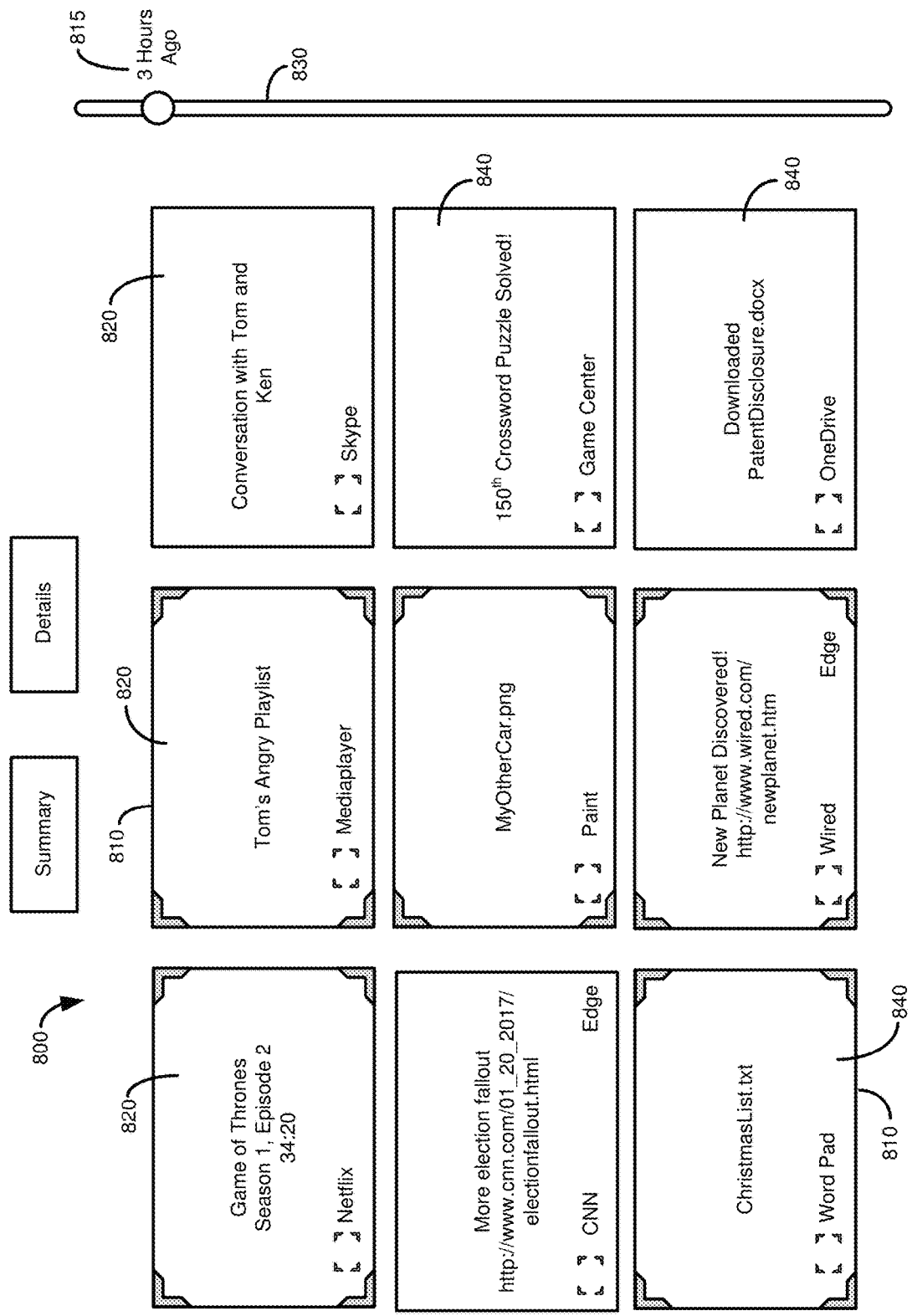

FIGS. 8A and 8B illustrate a display 800 that provides a visual indication of activity relevance as the user interacts with the display. The display 800 can represent a particular example of an activity summary display 400. However, the scrolling concepts described herein can be used with other displays, including other displays described and/or depicted in the present disclosure.

FIG. 8A illustrates the display 800 where the user has scrolled to a first time period—30 minutes before a current time. FIG. 8B illustrates the display at a later time—3 hours before a current time. The current scroll value, such as a time relative to a current time, can be provided by a display element 815. The display 800 illustrates a plurality of activity representations 810, which can analogous to the activity representations 410. Each of the activity representations 810 is associated with a relevance value, which can include, or be, a duration the user was actively engaged in the activity over a time period.

FIG. 8A includes long-running, highly relevant activities 820 and shorter-running, less relevant activities 825. As the user transitions from the display 800 of FIG. 8A to the display of FIG. 8B by adjusting the position of a control element, the scrollbar 830, the longer-running activities 820 remaining on the screen, which the shorter-running activities 825 are removed. The longer-running activities 820 are displayed at a higher vertical position in FIG. 8B, indicating that they are approaching their start time, and eventually will be removed from the display (e.g., activity representation 835).

New activity representations 840 are shown as added to FIG. 8B to maintain a total of nine displayed activity representations 810, which can be the designated number to be displayed in any display 800. Of course, the number of displayed activity representations 810 is not limited to any particular number, and in some cases can vary, including as selected by a user.

It should be appreciated that over the time period represented by FIGS. 8A and 8B, there may be activities that are not displayed on the display 800, such as because they do not meet the relevance criteria. Such activities can include long-running activities where a user was less actively engaged with the activity than a shorter-running activity where the user was more actively engaged over the duration of the activity.

Method for Rendering Activity Summary Display

Figure 9:
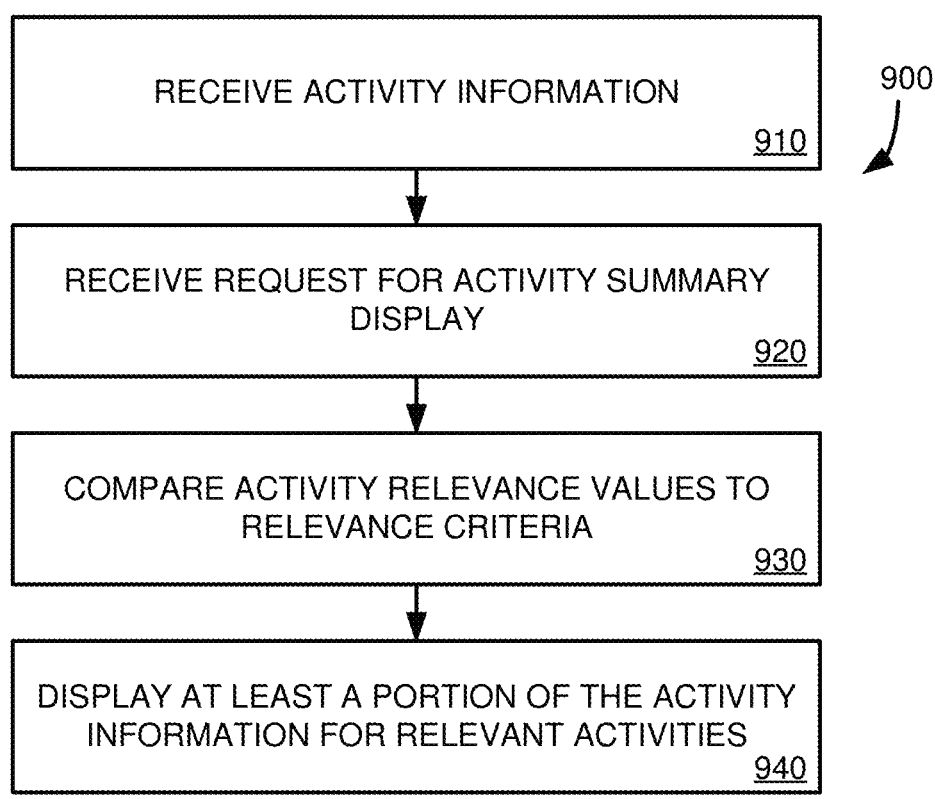
FIG. 9 is a flowchart of an example method for displaying a summary of user activity.

FIG. 9 illustrates a method 900 for displaying an activity summary display of user activity information meeting particular relevance criteria. At 910, activity information is received for a plurality of user activities. The activity information can be, for example, history records, activity records derived from history records, task records derived from activity records, or a combination thereof. A request for an activity summary display is received at 920. At 930, relevance criteria values are compared with relevance criteria specified for the activity summary display. For example, a total engagement time for an activity, such as a total engagement time over a time period, is compared with a threshold total engagement time. Or, a selected number of activities having the highest total engagement time over the time period are selected as the most relevant activities. In other cases, the most relevant activities can be selected in another manner, such as using a global or local relevance value (e.g., the value of the global relevance identifier 220, 276 or the local relevance identifier 296 of FIG. 2). At least a portion of the activity information of the selected activities is displayed at 940.

Figure 10:
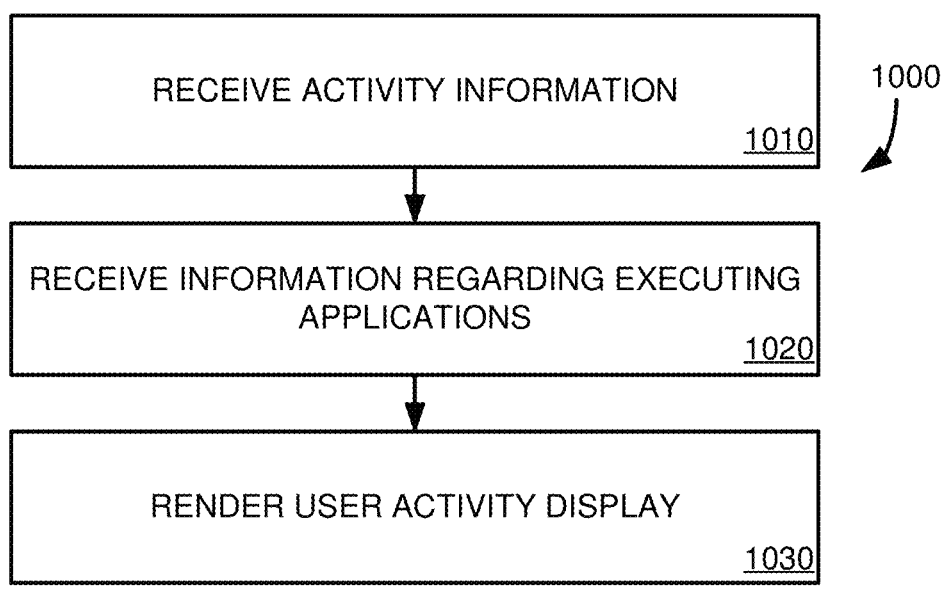
FIG. 10 is a flowchart of an example method for displaying past user activity in conjunction with applications currently being executed by a user.

Method for Rendering Display of Currently Executing Applications and Prior User Activity FIG. 10 illustrates a method 1000 for rendering for display a display that includes currently executing applications and information for a plurality of user activities. Information regarding user activities is received at 1010. At 1020, information is received regarding applications being executed by the user. A user activity display including at least a portion of the information regarding the applications being executed by the user and at least a portion of the user activity information is rendered for display at 1030.

Figure 11:
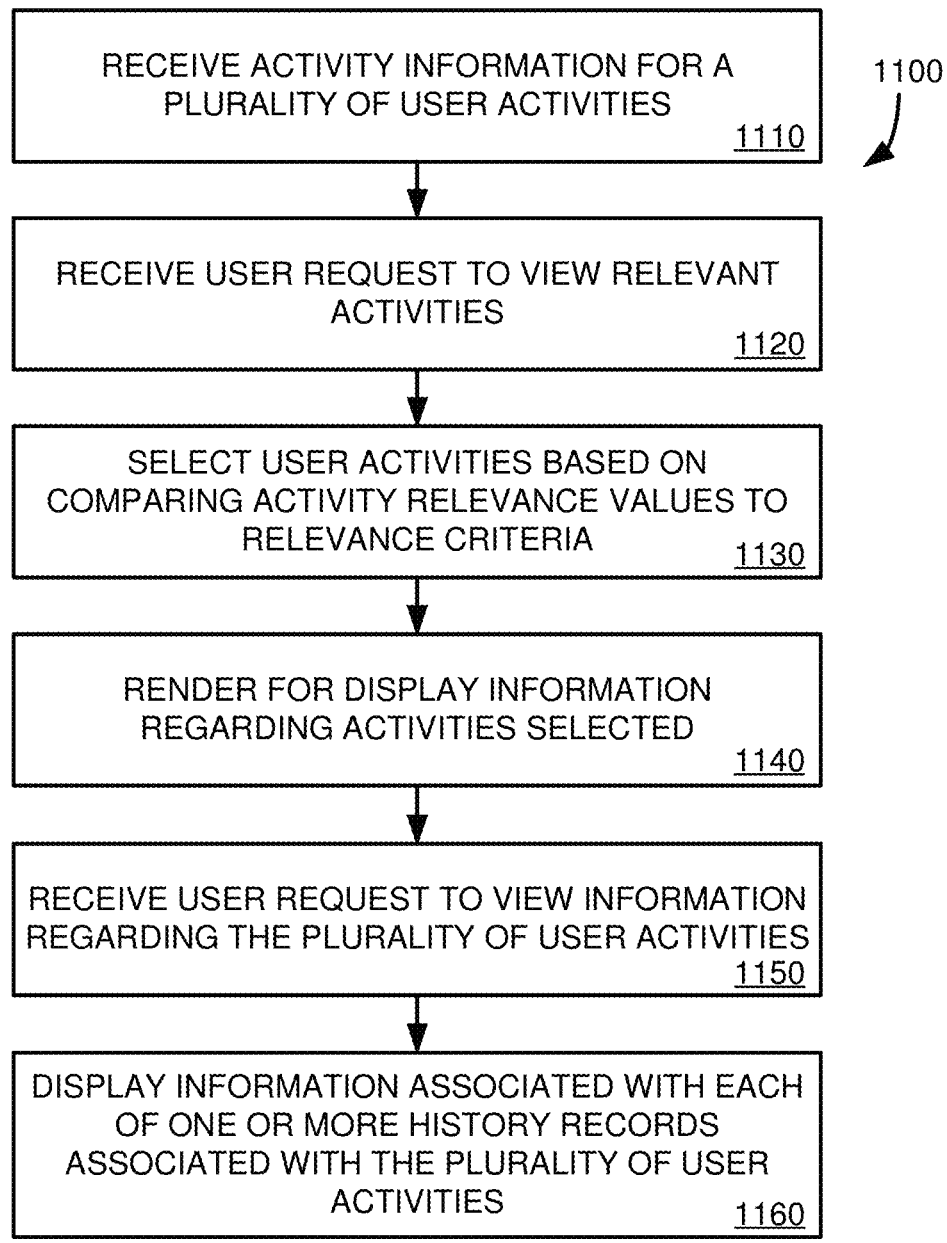
FIG. 11 is a flowchart of an example method for selectively displaying summary or detailed views of user activity.

Method for Selectively Displaying User Activity Summary Display and Display of Detailed User Activity FIG. 11 illustrates a method 1100 for allowing a user to selectively view an activity summary display and a detailed view of the user's activities. At 1110, activity information for a plurality of user activities is received. A user request to view relevant activities is received at 1120. At 1130, user activities are selected based on comparing activity relevance values of the plurality of user activities to relevance criteria. Information regarding the selected activities is rendered for display at 1140.

At 1150, a request by a user to view information regarding the plurality of user activities is received. At 1160, for each of the plurality of user activities, information associated with each of one or more history records associated with the respective user activity is displayed.

Computing Systems

Figure 12:
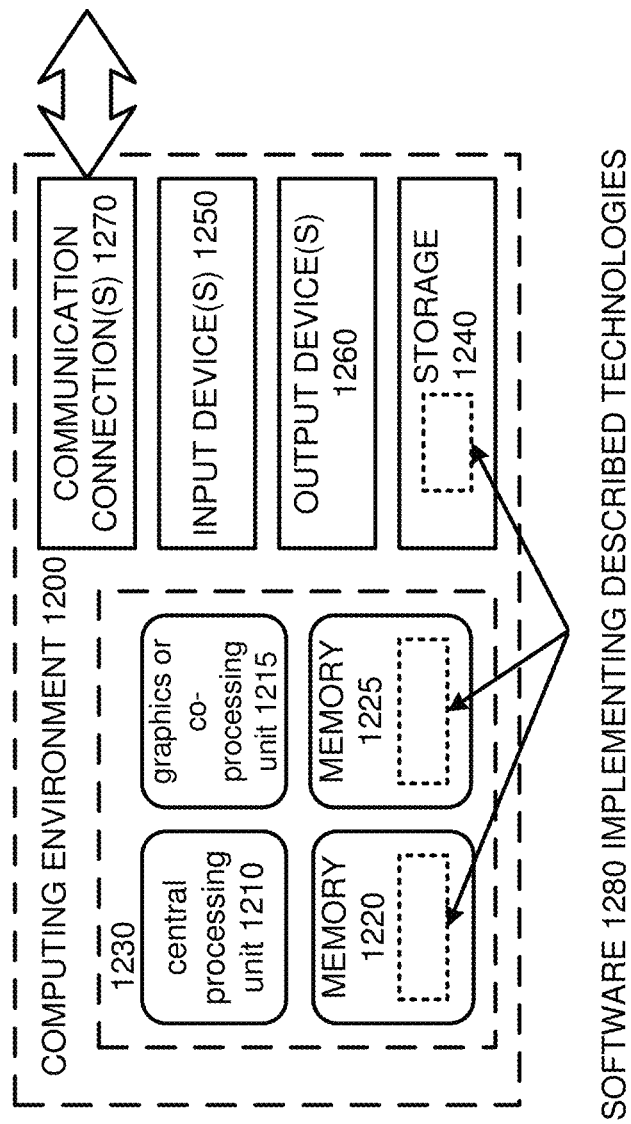
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown, e.g., operating system 504 of FIG. 5) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computer device. In general, a computing system or computer device can be local or distributed, and can include any combination of special-purpose hardware and/or general-purpose hardware with software implementing the functionality described herein. In various examples described herein, a module (e.g., component or engine) is described as being "coded" to perform certain operations or provide certain functionality, indicating that computer-executable instructions for the module can be executed to perform such operations, cause such operations to be performed, or to otherwise provide such functionality.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 13:
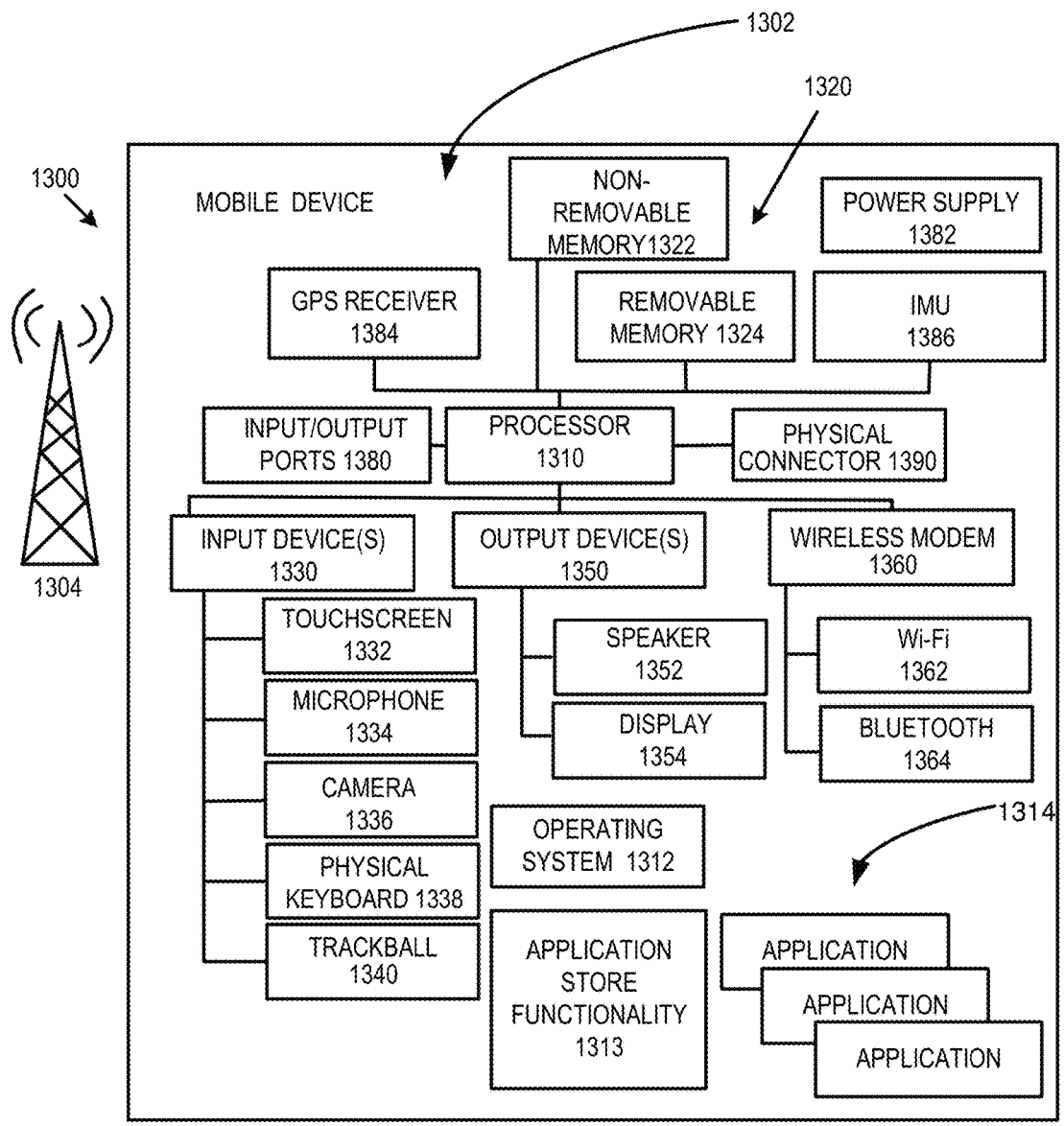
FIG. 13 is an example mobile device that can be used in conjunction with the technologies described herein.

FIG. 13 is a system diagram depicting an example mobile device 1300 including a variety of optional hardware and software components, shown generally at 1302. Any components 1302 in the mobile device can communicate with any other component, although not all connections are shown, for ease of illustration. The mobile device can be any of a variety of computer devices (e.g., cell phone, smartphone, handheld computer, Personal Digital Assistant (PDA), etc.) and can allow wireless two-way communications with one or more mobile communications networks 1304, such as a cellular, satellite, or other network. The mobile device 1300 can represent a source device (e.g., a computer device 308 of FIG. 3).

The illustrated mobile device 1300 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components 1302 and support for one or more application programs 1314. The application programs can include common mobile computing applications (e.g., email applications, calendars, contact managers, web browsers, messaging applications), or any other computing application. Functionality 1313 for accessing an application store can also be used for acquiring and updating application programs 1314.

The illustrated mobile device 1300 can include memory 1320. Memory 1320 can include non-removable memory 1322 and/or removable memory 1324. The non-removable memory 1322 can include RAM, ROM, flash memory, a hard disk, or other well-known memory storage technologies. The removable memory 1324 can include flash memory or a Subscriber Identity Module (SIM) card, which is well known in GSM communication systems, or other well-known memory storage technologies, such as "smart cards." The memory 1320 can be used for storing data and/or code for running the operating system 1312 and the applications 1314. Example data can include web pages, text, images, sound files, video data, or other data sets to be sent to and/or received from one or more network servers or other devices via one or more wired or wireless networks. The memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1300 can support one or more input devices 1330, such as a touchscreen 1332, microphone 1334, camera 1336, physical keyboard 1338 and/or trackball 1340 and one or more output devices 1350, such as a speaker 1352 and a display 1354. Other possible output devices (not shown) can include piezoelectric or other haptic output devices. Some devices can serve more than one input/output function. For example, touchscreen 1332 and display 1354 can be combined in a single input/output device.

The input devices 1330 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1312 or applications 1314 can comprise speech-recognition software as part of a voice user interface that allows a user to operate the device 1300 via voice commands. Further, the device 1300 can comprise input devices and software that allows for user interaction via a user's spatial gestures, such as detecting and interpreting gestures to provide input to a gaming application.

A wireless modem 1360 can be coupled to an antenna (not shown) and can support two-way communications between the processor 1310 and external devices, as is well understood in the art. The modem 1360 is shown generically and can include a cellular modem for communicating with the mobile communication network 1304 and/or other radio-based modems (e.g., Bluetooth 1064 or Wi-Fi 1062). The wireless modem 1360 is typically configured for communication with one or more cellular networks, such as a GSM network for data and voice communications within a single cellular network, between cellular networks, or between the mobile device and a public switched telephone network (PSTN).

The mobile device can further include at least one input/output port 1380, a power supply 1382, a satellite navigation system receiver 1384, such as a Global Positioning System (GPS) receiver, an inertial measurement unit (IMU) 1386 (or one or more components thereof, such as a magnetometer, an accelerometer, or a gyroscope, or similar types of sensors), and/or a physical connector 1390, which can be a USB port, IEEE 1394 (FireWire) port, and/or RS-232 port. The illustrated components 1302 are not required or all-inclusive, as any components can be deleted and other components can be added.

Cloud-Supported Environment

Figure 14:
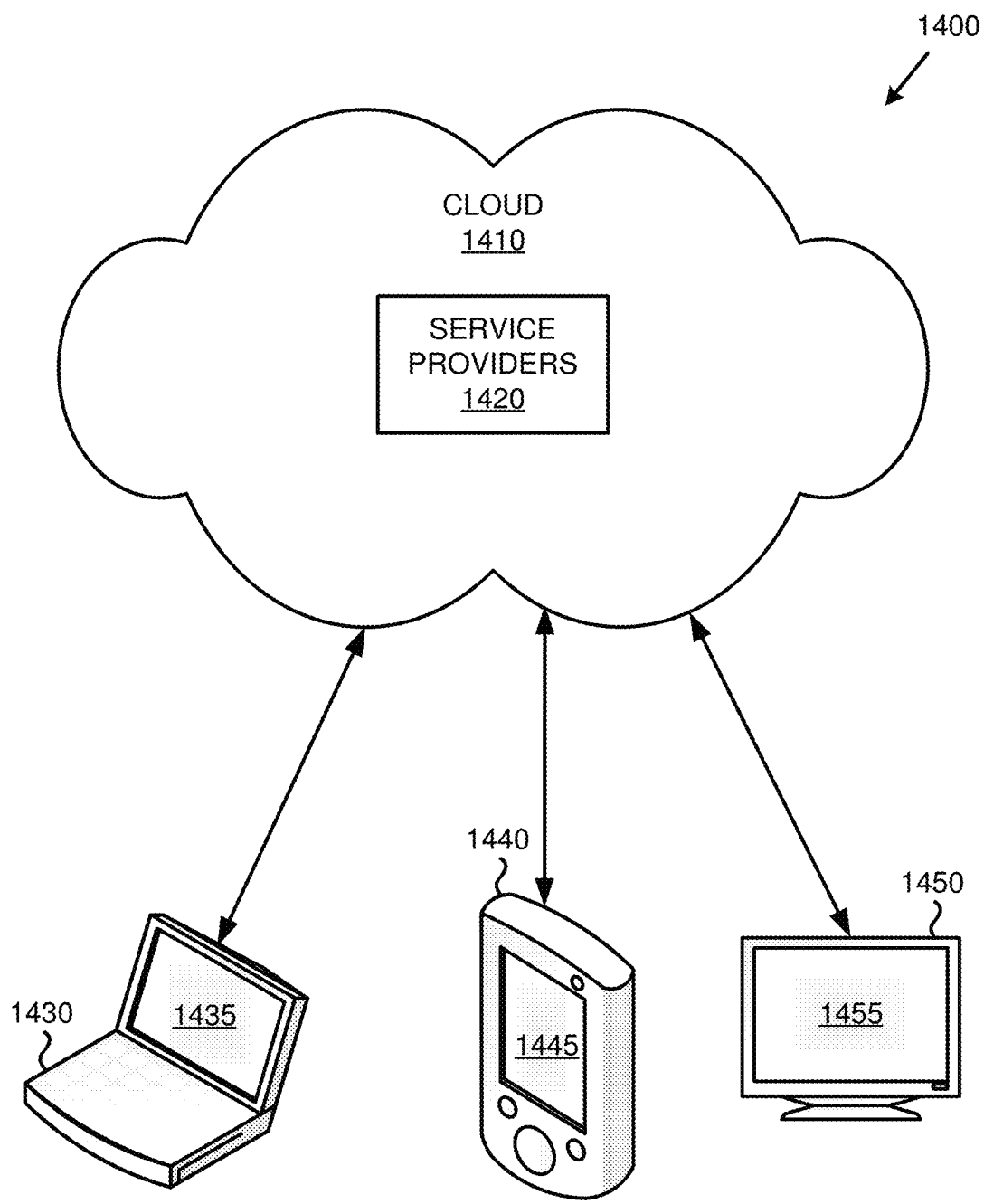
FIG. 14 is an example cloud-support environment that can be used in conjunction with the technologies described herein.

FIG. 14 illustrates a generalized example of a suitable cloud-supported environment 1400 in which described embodiments, techniques, and technologies may be implemented. In the example environment 1400, various types of services (e.g., computing services) are provided by a cloud

1410 (e.g., network 328 of FIG. 3). For example, the cloud 1410 can comprise a collection of computer devices, which may be located centrally or distributed, that provide cloud-based services to various types of users and devices connected via a network such as the Internet. The implementation environment 1400 can be used in different ways to accomplish computing tasks. For example, some tasks (e.g., processing user input and presenting a user interface) can be performed on local computer devices (e.g., connected devices 1430, 1440, 1450) while other tasks (e.g., storage of data to be used in subsequent processing) can be performed in the cloud 1410.

In example environment 1400, the cloud 1410 provides services for connected devices 1430, 1440, 1450 with a variety of screen capabilities. Connected device 1430 represents a device with a computer screen 1435 (e.g., a mid-size screen). For example, connected device 1430 could be a personal computer such as desktop computer, laptop, notebook, netbook, or the like. Connected device 1440 represents a device with a mobile device screen 1445 (e.g., a small size screen). For example, connected device 1440 could be a mobile phone, smart phone, personal digital assistant, tablet computer, and the like.

Connected device 1450 represents a device with a large screen 1455. For example, connected device 1450 could be a television screen (e.g., a smart television) or another device connected to a television (e.g., a set-top box or game console) or the like.

One or more of the connected devices 1430, 1440, 1450 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1400. For example, the cloud 1410 can provide services for one or more computers (e.g., server computers) without displays.

Services can be provided by the cloud 1410 through service providers 1420, or through other providers of online services (not depicted). For example, cloud services can be customized to the screen size, display capability, and/or touchscreen capability of a particular connected device (e.g., connected devices 1430, 1440, 1450).

In example environment 1400, the cloud 1410 provides the technologies and solutions described herein to the various connected devices 1430, 1440, 1450 using, at least in part, the service providers 1420. For example, the service providers 1420 can provide a centralized solution for various cloud-based services. The service providers 1420 can manage service subscriptions for users and/or devices (e.g., for the connected devices 1430, 1440, 1450 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computer device (i.e., any available computer device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 12, computer-readable storage media include memory 1220 and 1225, and storage 1240. By way of example and with reference to FIG. 12, computer-readable storage media include memory and storage 1220, 1222, and 1224. The term computer-readable storage media does not include signals and carrier waves. In addition, the term computer-readable storage media does not include communication connections, such as 1270, 1260, 1262, and 1264.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computer device for controlling data presented to a user, the computer device comprising:
a processing unit; and
memory;
the computer device configured, via computer-executable instructions, to perform operations for implementing:
an activity store, the activity store coded to store activity information encoded in a data structure for a plurality of activities, the activity information for each of at least a portion of the plurality of activities comprising an application identifier and a content identifier, the activity information for the at least a portion of the plurality of user activities further comprising:
(a) a first activity record comprising (i) a first application identifier used by a user to interact with first discrete content; and (ii) a first content identifier for the first discrete content, the first content identifier comprising a file name;
(b) a second activity record comprising (i) a second application identifier used by the user to interact with second discrete content; and (ii) a second content identifier for the second discrete content, the second content identifier comprising a URL for a webpage;
an activity summary template, the activity summary template coded to specify relevance criteria for activities of the plurality of activities to include in an activity summary display, wherein the activity information comprises information useable to rank activities meeting relevance criteria relative to one another whereby a set of most relevant activities can be selected and included in the activity summary display;
a rules engine, the rules engine coded to search the data structure and select activities of the plurality of activities responsive to the relevance criteria; and
a display engine, the display engine coded to render the activity summary display based on the activity summary template using activity information of the activities selected by the rules engine.

2. The computer device of claim 1, wherein the activity information for each of the plurality of activities includes a relevance value and the relevance criteria comprises a threshold relevance value.

3. The computer device of claim 1, wherein the activity information for each of the plurality of activities comprises an engagement time and the relevance criteria comprises a threshold engagement time.

4. The computer device of claim 1, wherein the activity information for each of the plurality of activities comprises a time a user last engaged in the activity and the activity summary template specifies that selected activities are displayed in an order based on the times the user last engaged in the selected activities.

5. The computer device of claim 4, wherein the activity information for each of the plurality of activities comprises an engagement time and the activity summary template is coded to specify that selected activities are displayed in an order based on the engagement times of the selected activities.

6. The computer device of claim 1, wherein the activity information for each of the plurality of activities comprises a relevance value and the activity summary template is coded to specify that selected activities are displayed in an order based on the relevance values of the selected activities.

7. The computer device of claim 1, wherein the activity summary template is coded to specify an area of the activity summary display in which to display applications currently being executed by a user.

8. The computer device of claim 1, wherein the activity summary template is coded to define a scrollbar, the scrollbar allowing the user to scroll through the plurality of selected activities displayed on the activity summary display.

9. The computer device of claim 1, wherein the activity information for each of the plurality of activities comprises activation information, the activation information useable to resume the activity.

10. The computer device of claim 9, further comprising:
a user interface component, the user interface component coded to receive user input for the activity summary display;
wherein the display engine is coded to execute the activation information for a displayed activity in response to user input through the user interface component.

11. The computer device of claim 1, wherein the activity information for each of the plurality of activities comprises one or more history records comprising activity information, the operations further comprising operations for implementing:
an activity details display template, the activity details display template coded to define an activity detail display comprising at least a portion of the activity information for each of the one or more history records of at least a portion of the plurality of activities;
wherein the display engine is coded to render the activity details display using, for each of at least a portion of the plurality of activities, at least a portion of the activity information for each of one or more history records for the activity.

12. The computer device of claim 11, wherein the activity information displayed on the activity summary display comprises information from multiple computer devices.

13. The computer device of claim 11, wherein the activity summary template comprises a user interface element coded to cause the display of the activity details display.

14. The computer device of claim 1, further comprising:
a user interface component, the user interface component coded to receive user input specifying activity search criteria;
a search results template, the search results template coded to specify a search results display;
wherein the rules engine is coded to select activities of the plurality of activities responsive to the search criteria and the display engine is coded to render the search results display based on the search results template using activity information of the activities selected by the rules engine as responsive to the search criteria.

15. The computer device of claim 14, wherein at least a portion of the activity information of the search results display is different than the activity information of the activity summary display.

16. A computer-readable storage medium storing computer-executable instructions for execution on a computer device to perform operations for controlling data displayed to a user, the operations comprising:
receiving activity data for a plurality of user activities, the activity data comprising:
  (a) a first activity record comprising (i) a first application identifier used by a user to interact with first discrete content; and (ii) a first content identifier for the first discrete content, the first content identifier comprising a file name;
  (b) a second activity record comprising (i) a second application identifier used by the user to interact with second discrete content; and (ii) a second content identifier for the second discrete content, the second content identifier comprising a URL for a webpage;
storing the activity data in a data structure;
receiving data regarding a plurality of applications currently being executed by the computer device, the data regarding the plurality of applications currently being executed by the computer device comprising (i) a third application identifier; and (ii) a third content identifier for third discrete content being accessed by an application associated with the third application identifier;
rendering for display the user activity display, the user activity display comprising at least a portion of the activity data for the plurality of user activities, including an indicator of an application associated with the first application identifier, and at least a portion of the data regarding the plurality of applications currently being executed by the computer device including an indicator of an application associated with the third application identifier.

17. The computer-readable storage medium of claim 16, wherein the activity data, for each of the plurality of user activities, comprises activation data, the activation data useable to resume the activity.

18. The computer-readable storage medium of claim 16, the operations further comprising:
receiving, for the first activity record, a plurality of history records that reference the first activity record, each of the plurality of history records providing a duration, or information useable to determine a duration, with which the user engaged with content identified by the first content identifier using the application identified by the first application identifier.

19. A method, implemented by a computer device, for controlling user activity data displayed to a user, the method comprising:
receiving activity data for a plurality of user activities, the activity data comprising:
  (a) a first activity record comprising (i) a first application identifier used by a user to interact with first discrete content; (ii) a first content identifier for the first discrete content, the first content identifier comprising a file name; and (iii) a first relevance value;
  (b) a second activity record comprising (i) a second application identifier used by the user to interact with second discrete content; (ii) a second content identifier for the second discrete content, the second content identifier comprising a URL for a webpage; and (iii) a second relevance value;
storing the activity data in a data structure;
receiving a user request to view relevant user activities;
searching that data structure and selecting user activities based on comparing the relevance values of a plurality of user activities, including the first relevance value and the second relevance value, to relevance criteria;
retrieving from the data structure and rendering for display data regarding the selected user activities;
receiving a user request to view data regarding the plurality of user activities; and
for each of at least a portion of the plurality of user activities, retrieving from the data structure and displaying data associated with each of one or more history records associated with the activity.

20. The method of claim 19, wherein rendering for display data regarding the selected user activities comprises displaying data associated with a most recent history record for each of the selected user activities.

* * * * *